United States Patent
Zhang

(10) Patent No.: US 10,912,124 B2
(45) Date of Patent: Feb. 2, 2021

(54) COMMUNICATION METHOD AND APPARATUS, AND SYSTEM

(71) Applicant: Huawei Technologies Co., Ltd., Shenzhen (CN)

(72) Inventor: Jian Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/370,155

(22) Filed: Mar. 29, 2019

(65) Prior Publication Data

US 2019/0254078 A1    Aug. 15, 2019

Related U.S. Application Data

(63) Continuation of application No. PCT/CN2017/103059, filed on Sep. 23, 2017.

(30) Foreign Application Priority Data

Sep. 30, 2016   (CN) .......................... 2016 1 0877228

(51) Int. Cl.
*H04L 1/16*        (2006.01)
*H04W 74/08*    (2009.01)
(Continued)

(52) U.S. Cl.
CPC ........... *H04W 74/0833* (2013.01); *H04L 1/16* (2013.01); *H04W 72/0446* (2013.01);
(Continued)

(58) Field of Classification Search
CPC ...................................................... H04J 12/28
(Continued)

(56) References Cited

U.S. PATENT DOCUMENTS

2013/0242924 A1    9/2013 Kim et al.
2013/0322280 A1    12/2013 Pi
(Continued)

FOREIGN PATENT DOCUMENTS

CN           101426271 A       5/2009
CN           102215598 A      10/2011
(Continued)

OTHER PUBLICATIONS

ZTE, "Beamformed Random Access in NR", 3GPP TSG RAN WG1 Meeting #86, R1-166419, Aug. 22-26, 2016, 8 pages, Gothenburg, Sweden.
(Continued)

*Primary Examiner* — Dang T Ton
(74) *Attorney, Agent, or Firm* — Slater Matsil, LLP

(57) ABSTRACT

A method includes: receiving, by a terminal, time-frequency configuration information from a network side, where the time-frequency configuration information is used to indicate a random access channel (RACH) time-frequency resource; receiving, by the terminal, spatial configuration information from the network side, where the spatial configuration information is used to indicate an RACH spatial resource; forming, by the terminal, at least one beam based on the spatial configuration information, and sending, by using the at least one beam, a random access preamble to the network side on all or part of the RACH time-frequency resource indicated by the time-frequency configuration information; and receiving, by the terminal, a random access response (RAR) for the random access preamble from the network side.

13 Claims, 11 Drawing Sheets

(51) Int. Cl.
*H04W 74/00* (2009.01)
*H04W 72/04* (2009.01)
*H04B 7/06* (2006.01)

(52) U.S. Cl.
CPC ..... *H04W 72/0453* (2013.01); *H04W 74/006* (2013.01); *H04B 7/0695* (2013.01)

(58) Field of Classification Search
USPC .......................................................... 370/329
See application file for complete search history.

(56) References Cited

U.S. PATENT DOCUMENTS

| | | |
|---|---|---|
| 2014/0003250 A1 | 1/2014 | Seo et al. |
| 2014/0073337 A1* | 3/2014 | Hong .................... H04W 16/28 455/452.1 |
| 2014/0376466 A1 | 12/2014 | Jeong et al. |
| 2018/0042000 A1* | 2/2018 | Zhang ................. H04W 72/042 |
| 2020/0083946 A1* | 3/2020 | You ...................... H04W 76/19 |

FOREIGN PATENT DOCUMENTS

| | | |
|---|---|---|
| CN | 103716895 A | 4/2014 |
| CN | 103973412 A | 8/2014 |
| CN | 105720361 A | 6/2016 |
| WO | 2016115711 A1 | 7/2016 |

OTHER PUBLICATIONS

Samsung, "Random Access Procedure in NR," 3GPP TSG-RAN WG2 Meeting #95, R2-164695, Aug. 22-26, 2016, 7 pages, Gothenburg, Sweden.

* cited by examiner

COMMUNICATION METHOD AND APPARATUS, AND SYSTEM

CROSS-REFERENCE TO RELATED APPLICATIONS

This application is a continuation of International Application No. PCT/CN2017/103059, filed on Sep. 23, 2017, which claims priority to Chinese Patent Application No. 201610877228.8, filed on Sep. 30, 2016. The disclosures of the aforementioned applications are hereby incorporated by reference in their entireties.

TECHNICAL FIELD

This application relates to the field of communications technologies, and in particular, to a communication method and apparatus, and a system.

BACKGROUND

Currently, spectrum resources used in a mobile communications technology are mainly at low frequency bands (below 3 GHz). With development of mobile communications technologies, there are more mobile communications devices, more data needs to be transferred, and spectrum resources at low frequency bands become increasingly short. Spectrum resources that can be used at high frequency bands (at least 6 GHz, for example, a millimeter-wave band and a centimeter-wave band) are abundant. Using high frequency bands in the mobile communications technology can effectively relieve a situation of spectrum resource shortage.

As can be seen, application of high frequency bands to mobile communication is a future development tendency. However, when communication is performed by using the high frequency band spectrum resources, problems of a relatively long network access delay and low network access efficiency of a terminal often occur.

SUMMARY

Embodiments of the present application provide a communication method and apparatus, and a system, to improve network access efficiency of a terminal.

According to a first aspect, a communication method is provided. The communication method includes: receiving, by a terminal, time-frequency configuration information from a network side. The time-frequency configuration information is used to indicate a random access channel (RACH) time-frequency resource. The method further includes receiving, by the terminal, spatial configuration information from the network side. The spatial configuration information is used to indicate an RACH spatial resource. The method further includes forming, by the terminal, at least one beam based on the spatial configuration information, and sending, by using the at least one beam, a random access preamble to the network side on all or part of the RACH time-frequency resource indicated by the time-frequency configuration information. The method further includes receiving, by the terminal, a random access response (RAR) for the random access preamble from the network side.

According to a second aspect, a communication method is provided. The communication method includes: sending, by a network side, time-frequency configuration information to a terminal. The time-frequency configuration information is used to indicate an RACH time-frequency resource. The method further includes sending, by the network side, spatial configuration information to the terminal. The spatial configuration information is used to indicate an RACH spatial resource, so that the terminal forms at least one beam based on the spatial configuration information and initiates, by using the at least one beam, random access on all or part of the RACH time-frequency resource indicated by the time-frequency configuration information.

According to the foregoing aspects, the network side delivers the spatial configuration information to the terminal, and the terminal may form a sending beam based on the spatial configuration information and initiate random access by using the sending beam, thereby reducing a random access delay. Further, the network side may perform reception in a corresponding beam direction, thereby reducing a delay of discovering or recognizing a preferable communications beam.

According to the foregoing aspects, the spatial configuration information includes a beam identifier, and further includes an antenna weight and/or precoding information corresponding to the beam identifier.

According to the foregoing aspects, the network side further sends, to the terminal, information reflecting a correspondence between the RACH time-frequency resource and the RACH spatial resource. The terminal receives the information reflecting the correspondence between the RACH time-frequency resource and the RACH spatial resource. A process of sending, by the terminal, a random access preamble includes: forming at least one beam based on the spatial configuration information, and sending the random access preamble to the network side on all or part of the RACH time-frequency resource corresponding to each of the at least one beam.

Optionally, the information reflecting the correspondence between the RACH time-frequency resource and the RACH spatial resource includes a correspondence between the RACH time-frequency resource and a beam identifier.

According to the foregoing aspects, the spatial configuration information includes sending beam pattern information of the random access preamble.

Optionally, the sending beam pattern information of the random access preamble includes one or more of the following information: a beam angle, a beam width, a beam quantity, a beam sweeping direction, a beam sweeping range, a beam sweeping mode, a beam switching time, and a beam sending occasion.

According to the foregoing aspects, the terminal further sends a first trigger signal to the network side, where the first trigger signal is used to trigger the network side to send the spatial configuration information and/or the time-frequency configuration information. The network side receives the trigger signal, and sends the spatial configuration information and/or the time-frequency configuration information based on the trigger signal.

According to the foregoing aspects, the network side may further send activation information to the terminal, where the activation information is used to instruct the terminal to activate all or part of the RACH time-frequency resource indicated by the time-frequency configuration information on a target beam, and the target beam is all or some of the at least one beam. The terminal may receive the activation information from the network side, and activate, based on the activation information, the all or part of the RACH time-frequency resource indicated by the time-frequency configuration information on the target beam.

Optionally, the activation information may be, for example, an activation signal, and the activation signal includes a synchronization signal or a reference signal.

Further, the terminal may activate, based on a correspondence between the activation signal and a to-be-activated RACH time-frequency resource, an RACH time-frequency resource corresponding to the activation signal, where the correspondence between the activation signal and the to-be-activated RACH resource is preset in the terminal or is configured by the network side for the terminal. When the correspondence between the activation signal and the to-be-activated RACH resource is configured by the network side for the terminal, the network side further sends the correspondence between the activation signal and the to-be-activated RACH resource to the terminal.

Optionally, the activation information may be, for example, system information, Radio Resource Control (RRC) signaling, or Media Access Control (MAC) layer signaling.

Optionally, before receiving the activation information, the terminal may further send a second trigger signal to the network side, where the second trigger signal is used to trigger the network side to send the activation information. In this case, the network side receives the second trigger signal and sends the activation information based on the second trigger signal.

According to the foregoing aspects, optionally, the terminal may determine an RAR window and receive an RAR in the RAR window. A starting position of the RAR window is a kth symbol of an (n+m)th subframe, the RAR window has a length of L*N*M, n is a subframe in which a first beam used by the terminal to send the random access preamble is located, k is a symbol on which the first beam used to send the random access preamble is located, m is a preset quantity of subframes, L is a maximum quantity of opportunities for receiving an RAR in the RAR window and for one beam used to send the random access preamble, N is a quantity of symbols or subframes occupied by the RAR, M is a quantity of beams used to send the RAR, and the quantity of beams that is represented by M is for an opportunity for receiving the RAR.

Optionally, for an Xth beam used to send the random access preamble, an opportunity for receiving the RAR in the RAR window is located at a symbol position on which the Xth beam is located in a subframe+m subframes+(RAR symbol length/random access preamble symbol length)*X, where X is an integer greater than or equal to 0.

According to the foregoing aspects, optionally, the network side may further send RAR spatial resource information to the terminal. The terminal may receive the RAR spatial resource information from the network side, where the RAR spatial resource information is used to indicate a beam pattern of a sending beam of the RAR. The terminal receives the RAR based on the RAR spatial resource information.

Optionally, the RAR spatial resource information includes one or more of the following information: a beam angle, a beam width, a beam quantity, a beam sweeping direction, a beam sweeping range, a beam sweeping mode, a beam switching time, a beam sending occasion, a time offset between the starting position of the RAR window and the first beam used to send the random access preamble, and a length of the RAR window.

According to the foregoing aspects, optionally, the network side further sends synchronization channel information or reference signal information to the terminal on a beam used to send the RAR. In this case, the terminal receives the synchronization channel information or the reference signal information from the beam used to send the RAR.

According to the foregoing aspects, optionally, the network side may further send, to the terminal, random access preamble configuration information and information reflecting a correspondence between a random access preamble configuration and a downlink beam. In this case, the terminal receives, from the network side, the random access preamble configuration information and the information reflecting the correspondence between the random access preamble configuration and the downlink beam.

According to the foregoing aspects, optionally, the time-frequency configuration information and the spatial configuration information are sent by the network side to the terminal by using one message. For example, the network side sends random access resource configuration information to the terminal, where the random access resource configuration information includes the time-frequency configuration information and the spatial configuration information. In this case, the terminal receives the random access resource configuration information, thereby obtaining the time-frequency configuration information and the spatial configuration information.

Optionally, the random access resource configuration information further includes the information reflecting the correspondence between the RACH time-frequency resource and the RACH spatial resource.

Optionally, the random access resource configuration information further includes the information reflecting the correspondence between the random access preamble configuration and the downlink beam.

According to the foregoing aspects, optionally, the network side sends the time-frequency configuration information and the spatial configuration information to the terminal through a low-frequency cell. Further, the network side sends, to the terminal through the low-frequency cell, the information reflecting the correspondence between the RACH time-frequency resource and the RACH spatial resource. Further, the network side sends, to the terminal through the low-frequency cell, the information reflecting the correspondence between the random access preamble configuration and the downlink beam.

According to the foregoing aspects and optional manners, behavior of the network side may be performed by a radio access network (RAN) device.

According to a third aspect, a communications apparatus is provided. The communications apparatus is applied to a terminal, and includes units or means used to perform the steps according to the first aspect or any optional manner of the first aspect.

According to a fourth aspect, a communications apparatus is provided. The communications apparatus is applied to an RAN device, and includes units or means used to perform the steps according to the second aspect or any optional manner of the second aspect.

According to a fifth aspect, a communications apparatus is provided. The communications apparatus includes a processor and a memory. The memory is configured to store a program. When the communications apparatus is located in a terminal, the processor invokes the program stored in the memory, to perform the method according to the first aspect or any optional manner of the first aspect; or when the communications apparatus is located in an RAN device, the processor invokes the program stored in the memory, to perform the method according to the second aspect or any optional manner of the second aspect.

According to a sixth aspect, a communications apparatus is provided. The communications apparatus is applied to a terminal, and includes at least one processing element or chip configured to perform the method according to the first aspect or any optional manner of the first aspect. Alternatively, a communications apparatus is provided. The communications apparatus is applied to an RAN device, and includes at least one processing element or chip configured to perform the method according to the second aspect or any optional manner of the second aspect.

According to a seventh aspect, a program is provided. When executed by a processor, the program is used to perform the method according to the first aspect or any optional manner of the first aspect; or is used to perform the method according to the second aspect or any optional manner of the second aspect.

According to an eighth aspect, a program product is provided. The program product, for example, a computer-readable storage medium, includes the program according to the seventh aspect.

According to a ninth aspect, a communication method is provided. The communication method includes: configuring, by an RAN device, a first subframe as a PDCCH sweeping subframe, where the PDCCH sweeping subframe includes a plurality of symbol units, and each symbol unit is configured to send a PDCCH by using a beam; and sending, by the RAN device, a PDCCH on each symbol unit by using a beam.

According to a tenth aspect, a communication method is provided. The communication method includes: monitoring, by a terminal, a PDCCH on a PDCCH sweeping subframe; and demodulating, by the terminal, the PDCCH when detecting the PDCCH, where the PDCCH sweeping subframe includes a plurality of symbol units, and each symbol unit is configured to send a PDCCH by using a beam.

In the foregoing method, a PDCCH sweeping subframe is set on a network side. In this way, a random access process may be triggered by using the PDCCH sweeping subframe, thereby reducing a random access delay, and reducing overheads of maintaining beam training between the network side and the terminal.

According to the foregoing aspects, the symbol unit may include one or more symbols, in other words, each beam occupies one or more symbols.

According to the foregoing aspects, beams on the plurality of symbol units may be wide beams or a plurality of beams performing sweeping in parallel.

According to the foregoing aspects, the RAN device sends downlink beam pattern information to the terminal, so that the terminal monitors the PDCCH based on the downlink beam pattern information, and further demodulates the PDCCH.

Optionally, the downlink beam pattern information may include one or more of the following information: a beam width, a beam angle, a beam direction, a beam sweeping sequence, a beam quantity, and the like.

According to the foregoing aspects, the RAN device may further send a reference signal and/or a synchronization channel on each beam. In this case, the terminal receives the reference signal and/or the synchronization channel, and performs measurement based on the reference signal and/or the synchronization channel to obtain one or more optimal downlink beams. If channel reciprocity exists, an optimal uplink beam may be determined based on the channel reciprocity.

According to an eleventh aspect, a communications apparatus is provided. The communications apparatus is applied to an RAN device, and includes units or means used to perform the steps according to the ninth aspect or any optional manner of the ninth aspect.

According to a twelfth aspect, a communications apparatus is provided. The communications apparatus is applied to a terminal, and includes units or means used to perform the steps according to the tenth aspect or any optional manner of the tenth aspect.

According to a thirteenth aspect, a communications apparatus is provided. The communications apparatus includes a processor and a memory. The memory is configured to store a program. When the communications apparatus is located in an RAN device, the processor invokes the program stored in the memory, to perform the method according to the ninth aspect or any optional manner of the ninth aspect; or when the communications apparatus is located in a terminal, the processor invokes the program stored in the memory, to perform the method according to the tenth aspect or any optional manner of the tenth aspect.

According to a fourteenth aspect, a communications apparatus is provided. The communications apparatus is applied to an RAN device, and includes at least one processing element or chip configured to perform the method according to the ninth aspect or any optional manner of the ninth aspect. Alternatively, a communications apparatus is provided. The communications apparatus is applied to a terminal, and includes at least one processing element or chip configured to perform the method according to the tenth aspect or any optional manner of the tenth aspect.

According to a fifteenth aspect, a program is provided. When executed by a processor, the program is used to perform the method according to the ninth aspect or any optional manner of the ninth aspect; or is used to perform the method according to the tenth aspect or any optional manner of the tenth aspect.

According to a sixteenth aspect, a program product is provided. The program product, for example, a computer-readable storage medium, includes the program according to the fifteenth aspect.

DETAILED DESCRIPTION OF ILLUSTRATIVE EMBODIMENTS

Figure 1:
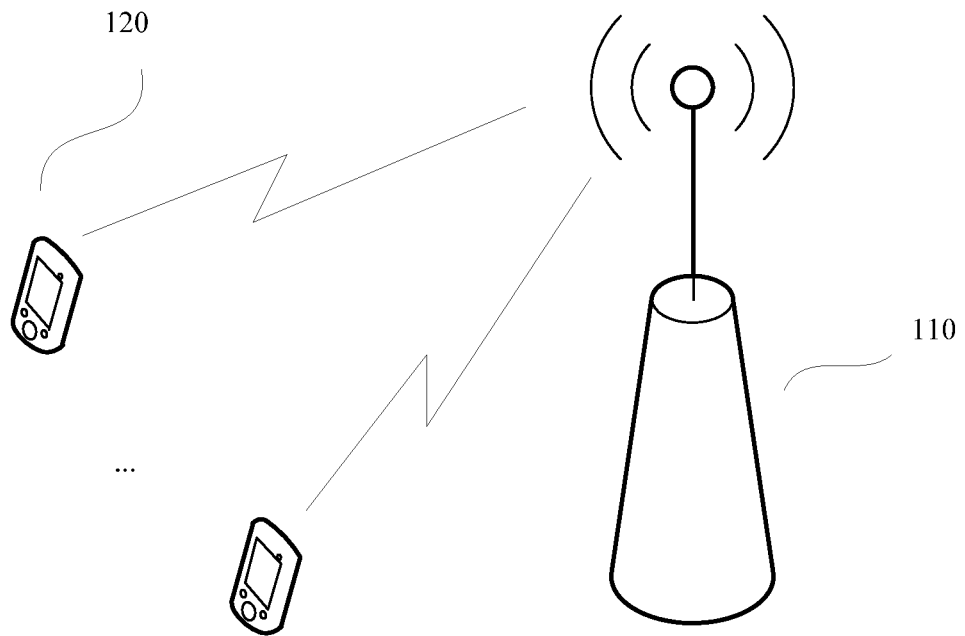
FIG. 1 is a schematic diagram of a communication scenario according to an embodiment of this application.

The described embodiments are merely some but not all of the embodiments of this application. All other embodiments obtained by persons of ordinary skill in the art based on the embodiments of this application without creative efforts shall fall within the protection scope of this application.

Some terms in this application are explained and described below for the convenience of understanding by persons skilled in the art.

(1) A terminal, also referred to as user equipment (UE), is a device providing voice and/or data connectivity for a user, for example, a handheld device or an in-vehicle device having a wireless connection function. A common terminal includes, for example, a mobile phone, a tablet computer, a notebook computer, a palmtop computer, a mobile Internet device (MID), or a wearable device such as a smartwatch, a smart band, or a pedometer.

(2) A radio access network (RAN) device, also referred to as a base station, is a device connecting a terminal to a wireless network, includes but is not limited to: an evolved NodeB (eNB), a radio network controller (RNC), a NodeB (NB), a base station controller (BSC), a base transceiver station (BTS), a home eNodeB (for example, Home evolved NodeB or a Home Node B HNB), a baseband unit (BBU), or a transmission receiving point (TRP). In addition, the RAN device may include a Wi-Fi access point (AP) or the like.

(3) A high frequency band is usually a frequency band above 6 GHz (including 6 GHz), for example, a centimeter-wave band or a millimeter-wave band. A low frequency band is usually a frequency band below 3 GHz (including 3 GHz).

(4) A high frequency (HF) cell is a cell using a high frequency band spectrum resource; and a low frequency (LF) cell is a cell using a low frequency band spectrum resource.

(5) "A plurality of" refers to two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects. A range described by "above", "below", or the like includes a boundary point. For example, below 3 GHz includes 3 GHz, and above 6 GHz includes 6 GHz.

FIG. 1 is a schematic diagram of a communication scenario according to an embodiment of this application. As shown in FIG. 1, a terminal 120 accesses a wireless network through an RAN device 110, to obtain a service of an external network (for example, the Internet) through the wireless network, or to communicate with another terminal through the wireless network. Currently, a process in which the terminal initially accesses a network is as follows:

After being powered on, the terminal 120 performs cell search. After the cell search, the terminal 120 achieves downlink synchronization with the cell, and can receive downlink data. Subsequently, the terminal initiates a random access process to establish a connection to the cell and achieve uplink synchronization, and uplink transmission may be further performed.

Figure 2:
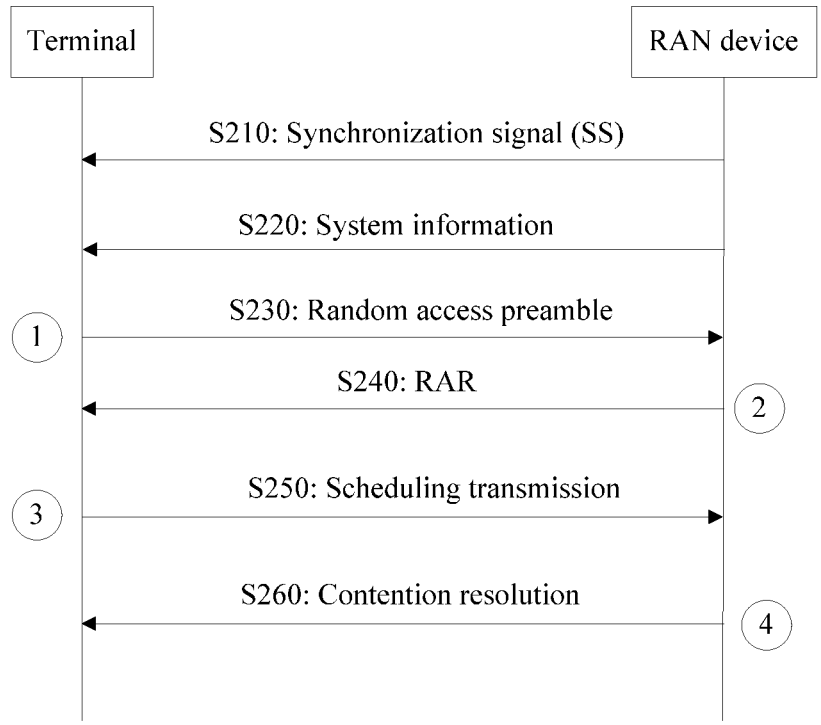
FIG. 2 is a schematic diagram of a process in which an existing terminal initially accesses a network.

FIG. 2 is a schematic diagram of an existing process in which a terminal initially accesses a network. As shown in FIG. 2, the process includes the following steps.

S210: An RAN device sends a synchronization signal (SS) to the terminal. The terminal receives the SS, determines a serving cell identifier based on the SS, and implements frame synchronization. The SS includes a primary synchronization signal (PSS) and a secondary synchronization signal (SSS).

S220: The RAN device broadcasts system information to the terminal. The system information may include a system information block 2 (SIB 2), and the SIB 2 includes physical random access channel (PRACH) configuration information.

The terminal has implemented frame synchronization with the RAN device in step S210, and therefore, may receive the system information, determine an optional PRACH resource based on PRACH configuration information in the system information, and select a PRACH resource therefrom to send a random access request. The random access request is implemented by using a random access preamble, to be specific, the following step S230 is performed.

S230: The terminal sends a random access preamble to the RAN device.

The RAN device detects the random access preamble on a PRACH, and performs step S240 when detecting the random access preamble sent by the terminal.

S240: The RAN device sends a random access response (RAR) to the terminal.

The RAR may carry information such as a random access preamble identifier (RAPID), timing advance (TA) information, and an initial uplink grant. When the RAPID received by the terminal is consistent with an ID of the previously sent random access preamble, the terminal considers that the response succeeds, and performs uplink scheduling transmission, to be specific, performs the following step S250.

S250: The terminal adjusts a time of uplink scheduling transmission based on the TA information, and performs uplink scheduling transmission on a resource indicated by the initial uplink grant.

Messages sent in steps S230 and S240 are respectively a message 1 (MSG 1) and a message 2 (MSG 2). A message of the uplink scheduling transmission is referred to as a message 3 (MSG 3). The message 3 may be transmitted by using a physical uplink shared channel (PUSCH). In an initial access process, the message 3 carries a radio resource control connection request (RRC connection request) message.

S260: The RAN device sends a message 4 (MSG 4) to the terminal, to perform contention resolution.

The message 4 carries a contention resolution ID. When receiving the contention resolution ID, the terminal may determine that random access succeeds. For example, in the initial access process, after receiving the message 3, the RAN device sends first six bytes of a Media Access Control (MAC) service data unit (SDU) of the message 3 to the terminal as the contention resolution ID of the terminal.

Steps S230 to S260 show a contention-based random access process. A non-contention-based random access process includes steps S230 and S240. In the non-contention-based random access process, the RAN device specifies a PRACH resource and a random access preamble for the terminal. The terminal uses the specified random access preamble to initiate random access on the specified PRACH resource. During initial RRC connection establishment, RRC connection re-establishment, and uplink out-of-synchronization, contention-based random access may be used. During handover and downlink out-of-synchronization, non-contention-based random access may be used. Certainly, if preambles are insufficient, contention-based random access may alternatively be used.

When a high frequency band spectrum resource is used in communication between the RAN device and the terminal, a disadvantage of a high path loss of a high frequency carrier is compensated for by using a beamforming (BF) technology, to provide better coverage.

Figure 3:
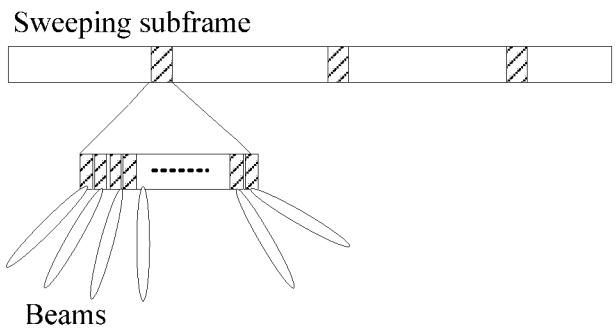
FIG. 3 is a schematic diagram showing that an RAN device or a terminal sends a signal in a beamforming manner according to an embodiment of this application.

FIG. 3 is a schematic diagram showing that an RAN device or a terminal sends a signal in a beamforming manner according to an embodiment of this application. For a public signal or a dedicated signal, a specified time may usually be allocated to perform beam sweeping. For example, one or more subframes are set. A plurality of beams in the subframe respectively send signals in a plurality of directions. To be distinguished from another subframe, the subframe may be referred to as a sweeping subframe. Each beam may occupy one or more symbols, and one symbol may simultaneously send one or more beams. For a downlink, the RAN device transmits a synchronization channel, a downlink reference signal, a broadcast channel, a data channel, and the like in the foregoing beam sweeping manner. For an uplink, the terminal transmits a random access channel, an uplink reference signal, a scheduling request, and the like in the foregoing beam sweeping manner.

Figure 4:
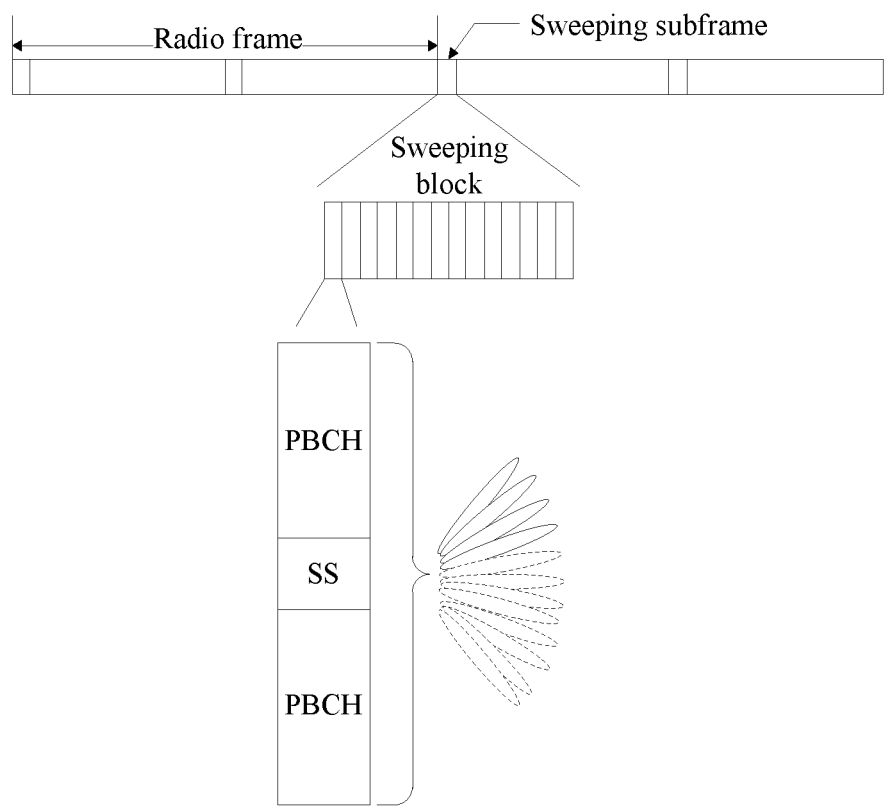
FIG. 4 is a schematic diagram of a transmission manner of downlink beam sweeping by using a synchronization channel as an example according to an embodiment of this application.
Figure 5:
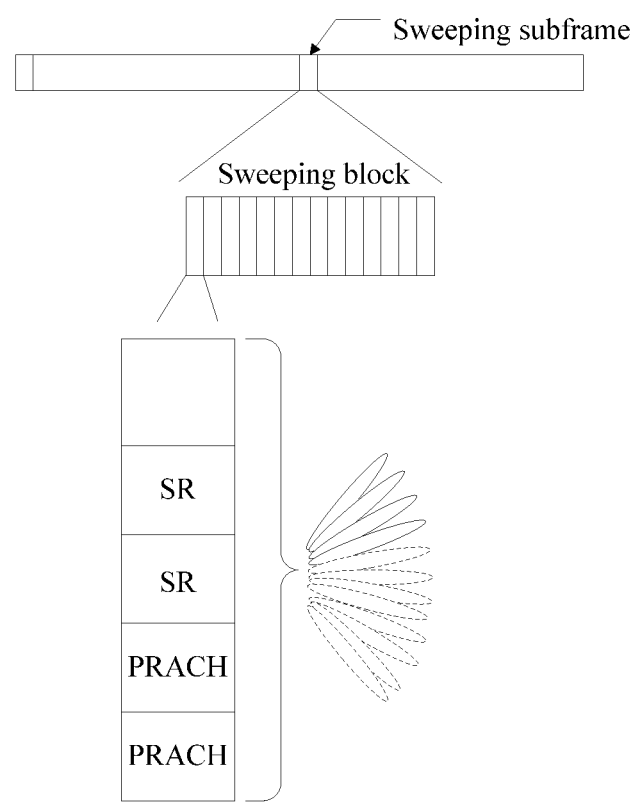
FIG. 5 is a schematic diagram of a transmission manner of uplink beam sweeping by using a PRACH as an example according to an embodiment of this application.

FIG. 4 and FIG. 5 respectively show transmission manners of downlink and uplink beam sweeping by using transmission on a synchronization channel and a PRACH as an example. As shown in FIG. 4 and FIG. 5, a sweeping subframe may include a plurality of sweeping blocks, and each sweeping block may occupy one or more symbols, and if a delay requirement is relatively high, may occupy, for example, one symbol. A period of a subframe in which a sweeping block is located, in other words, a sweeping subframe, is configurable. For example, the period is 5 ms, to be specific, every 5 ms includes one sweeping subframe. For another example, every 8 ms includes one sweeping subframe.

As shown in FIG. 4, an RAN device sweeps, on each sweeping block, one or more downlink beams to send an SS or a physical broadcast channel (PBCH). Herein, an example in which four downlink beams are swept once on each sweeping block for sending is used. Certainly, more or fewer downlink beams may alternatively be swept. In addition, quantities of downlink beams swept on sweeping blocks may be the same or different.

As shown in FIG. 5, a terminal sweeps one or more uplink beams on each sweeping block to send a scheduling request (SR) or a PRACH. Herein, an example in which four uplink beams are swept once on each sweeping block for sending is used. Certainly, more or fewer uplink beams may alternatively be swept. In addition, quantities of uplink beams swept on sweeping blocks may be the same of different.

When communication between the terminal and the RAN device is implemented by using a high frequency band spectrum resource and beamforming, problems of a relatively long network access delay of the terminal, high information overheads, and low efficiency often occur.

Based thereupon, this application provides several solutions, to improve network access efficiency of the terminal.

In a solution, a network side not only configures a time-frequency resource for random access, but also configures a spatial resource, so that the terminal initiates random access more rapidly based on the configured time-frequency resource and spatial resource. For example, the network side sends time-frequency configuration information and spatial configuration information to the terminal. The time-frequency configuration information is used to indicate a random access channel (RACH) time-frequency resource, and the spatial configuration information is used to indicate a RACH spatial resource. In other words, the time-frequency configuration information is used to indicate a time-frequency resource used for sending a random access preamble, and the spatial configuration information is used to indicate a spatial resource used for sending the random access preamble.

Currently, the RAN device delivers PRACH configuration information by using system information. The PRACH configuration information includes a PRACH frequency offset and a PRACH configuration index. The PRACH frequency offset is used to indicate a frequency-domain position of a PRACH resource. The PRACH configuration index is used to indicate a time-domain position of a PRACH resource. The terminal initiates a random access process based on the PRACH configuration information. When a high frequency band spectrum resource is used, the network side and the terminal need to perform beam training to select a communication beam pair. Beam training means that a transmit end and a receive end respectively sends a beam and receives a beam in a beam sweeping manner, to find a matching sending-receiving beam pair for subsequent communication. The transmit end and the receive end usually need to exchange characters to perform training on all beam directions to find the matching communication beam pair, resulting in a relatively long communication delay.

In the foregoing solution, the network side delivers the spatial configuration information to the terminal, and the terminal may form a sending beam based on the spatial configuration information and initiate random access by using the sending beam, thereby reducing a random access delay. Further, the network side may perform reception in a corresponding beam direction, thereby reducing a delay of discovering or recognizing a preferable communications beam. When channel reciprocity exists, an effect is better. In addition, subsequent message processing, for example, sending and reception of an RAR, may also be performed based on the spatial configuration information, thereby reducing a delay of the entire random access process.

Figure 6:
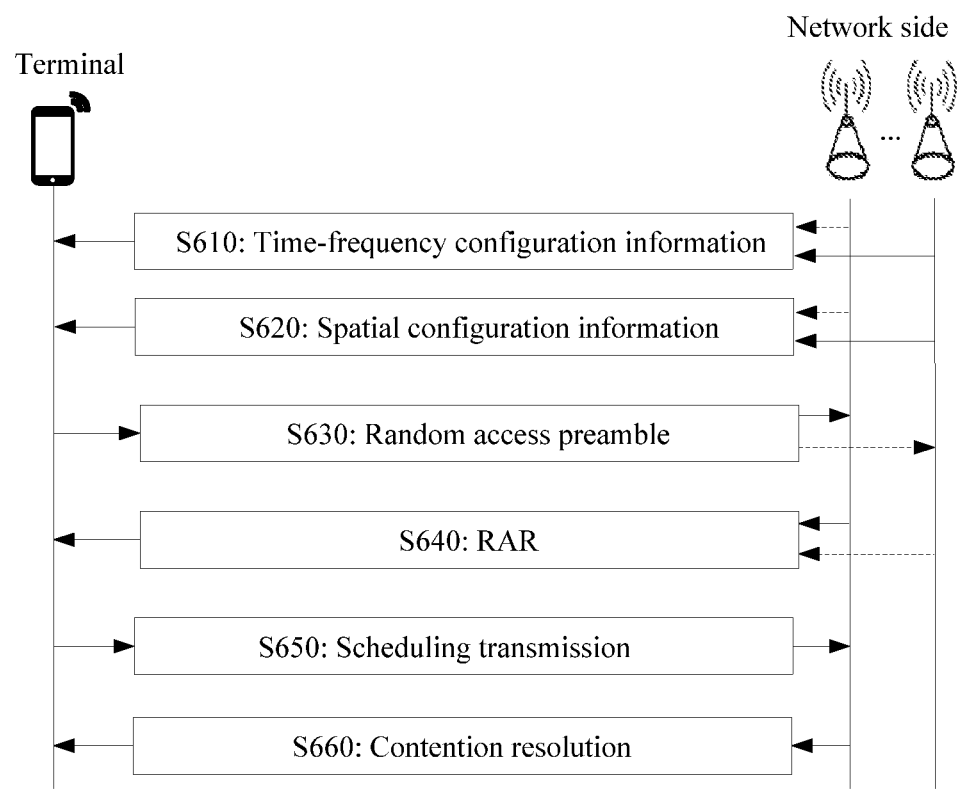
FIG. 6 is a schematic diagram of a communication method according to an embodiment of this application.

The foregoing solution is described with reference to the accompanying drawings. FIG. 6 is a schematic diagram of a communication method according to an embodiment of this application. As shown in FIG. 6, the method includes the following steps.

S610: A network side sends time-frequency configuration information to a terminal. The time-frequency configuration information is used to indicate a RACH time-frequency resource.

S620: The network side sends spatial configuration information to the terminal. The spatial configuration information is used to indicate an RACH spatial resource.

It should be noted that an RACH in this application may be a physical random access channel (PRACH) used to send a random access preamble, or may be a transmission channel, RACH. The transmission channel, RACH, is located between a Media Access Control (MAC) layer and a physical layer. Generally, PRACH configuration information is used to indicate information such as a time-frequency domain resource of a PRACH and a sequence of the random access preamble. RACH configuration information is used to indicate group information of the random access preamble, power information, RAR window information, contention resolution timer configuration information, index information of a random access preamble in a non-contention-based random access process, PRACH resource mask information, and the like. In this application, the RACH is used to represent a PRACH and/or an RACH.

The terminal receives the time-frequency configuration information and the spatial configuration information that are sent by the network side, and initiates random access based on the time-frequency configuration information and the spatial configuration information, to be specific, performs the following the step S630.

S630: The terminal forms at least one beam based on the spatial configuration information, and sends, by using the at least one beam, a random access preamble to the network side on all or part of the RACH time-frequency resource indicated by the time-frequency configuration information.

As an alternative to step S630, the terminal may select an RACH time-frequency resource corresponding to one or more optimal downlink beams by measuring a downlink synchronization channel or a reference signal based on a cell search stage, to send the random access preamble, so that the terminal sends the random access preamble to the network side only on part of the RACH time-frequency resource.

After receiving the random access preamble, the network side feeds back an RAR to the terminal, to be specific, performs the following step S640.

S640: The network side sends, to the terminal, an RAR for the random access preamble, and the terminal receives the RAR.

Optionally, a beam on which the network side sends the RAR may be further used to send one or more of the following information: a synchronization channel and a reference signal, so that the terminal uses the sent information to measure a downlink beam, to determine one or more optimal downlink beams.

Optionally, the network side may add information about one or more optimal uplink beams and corresponding beam patterns to the RAR message, to be used by the terminal to send a message 3.

Optionally, the network side receives the random access preamble, determines an optimal uplink beam based on strength of a received signal or a signal to interference plus noise ratio (SINR), and determines a corresponding optimal downlink beam based on channel reciprocity. There may be one or more optimal uplink beams and downlink beams. In this way, the network side sends the RAR on the one or more optimal downlink beams. It may be understood that the network side may receive the random access preamble through one or more TRPs, and determine a beam, by using which the RAR is sent to the terminal, of a TRP.

Optionally, the RAR includes synchronization channel information or reference signal information of a high-frequency cell. The synchronization channel information or the reference signal information is used by the terminal to measure channel quality of a downlink beam, for example, to measure reference signal received power (RSRP) or reference signal received quality (RSRQ).

Time-domain information for receiving an RAR by the terminal may be determined based on a time offset between a time point at which the terminal sends the random access preamble and a time point at which the terminal receives a first potential RAR, and information about the time offset may be pre-configured or pre-stipulated. Spatial information for receiving the RAR by the terminal may be determined based on the spatial configuration information that is of the random access preamble and is sent by the network side. For example, the network side receives the random access preamble based on the channel reciprocity and the spatial configuration information of the random access preamble, and sends the RAR on a downlink beam corresponding to an uplink beam on which the random access preamble is received. Correspondingly, the terminal forms a receiving beam based on the downlink beam corresponding to the uplink beam for sending random access preamble to receive the RAR.

The network side may pre-configure, for the terminal, beam pattern information used to send an RAR, so that the terminal receives an RAR beam based on the beam pattern information. Each RAR beam has a time-domain mapping relationship with an RACH resource. The mapping relationship may be pre-stipulated or included in configuration information, so that the terminal determines, based on a time frequency spatial resource used by the terminal to send the random access preamble and the RAR beam pattern information, a time frequency spatial resource used to receive the RAR.

For a non-contention-based random access process, the random access process is completed when the terminal receives an RAR. For a contention-based random access process, the following steps S650 and S660 further need to be performed. Steps S650 and S660 are similar to steps S250 and S260 shown in FIG. 2, and a difference is that beams used to send the message 3 and a message 4 may be selected beams. For example, the terminal determines, based on one or more optimal receiving beams used by the terminal to receive the RAR, an optimal uplink beam used to send the message 3. The terminal may receive the RAR by using one or more beams. If information contents included in the RARs received on more than one beams are the same, matches a time domain resource, a frequency domain resource, and a spatial resource of the random access preamble sent by the terminal, and matches a random access preamble index, the terminal determines that the RAR is for the terminal. If the RAR is received by using a plurality of beams, the terminal determines an uplink beam corresponding to a downlink beam with an optimal receiving condition based on measurement on reference signals or synchronization channels carried by the RAR beams, to send the message 3. For example, the terminal performs determining based on a beam having largest reference signal received power (RSRP). Alternatively, the RAR may carry optimal uplink beam information or beam pattern information, to indicate time domain resources, frequency domain resources, and spatial resources of one or more beams used by the terminal to send the message 3. The terminal sends the message 3 based on the optimal uplink beam information or beam pattern information carried in the RAR. Optionally, the terminal may indicate, in the message 3, optimal downlink beam information used by the network side to send the message 4. For another example, the network side may send the message 4 by using the information about one or more optimal downlink beams obtained in the foregoing step. The network side determines the optimal uplink beam based on a receiving and detection condition of an uplink beam of the received message 3 or a measurement condition of a reference signal of a beam on which the message 3 is located, to determine a corresponding downlink beam based on the channel reciprocity. Correspondingly, the terminal receives the message 4 by using the one or more optimal downlink receiving beams obtained in the foregoing step. Usually, if there is no conflict in the random access process, a delay of the random access process is relatively small. An optimal uplink beam used by the network side to receive the message 3 is basically consistent with an optimal uplink beam used to receive the random access preamble. An optimal downlink beam used by the network side to send the message 4 is basically consistent with an optimal downlink beam used by the network side to send the RAR.

Figure 7:
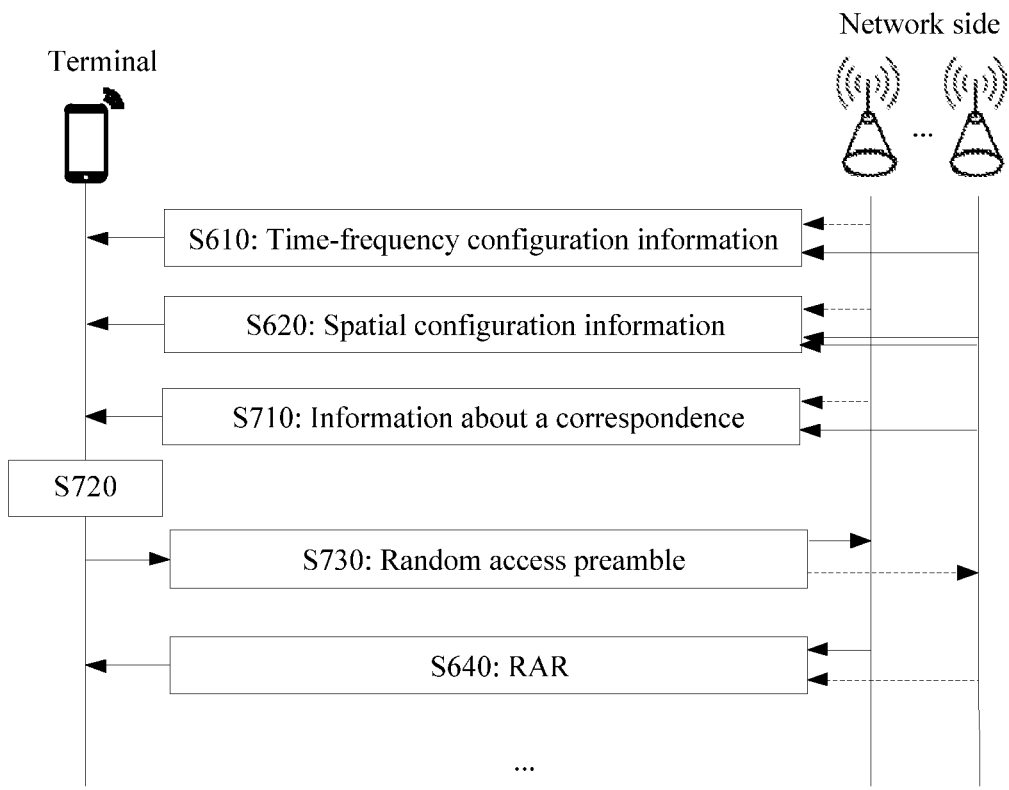
FIG. 7 is a schematic diagram of another communication method according to an embodiment of this application.

Optionally, the network side may further configure a correspondence between an RACH time-frequency resource and an RACH spatial resource for the terminal, so that the terminal selects an RACH time-frequency resource for a sending beam based on the correspondence. FIG. 7 is a schematic diagram of another communication method according to an embodiment of this application. As shown in FIG. 7, compared with the method shown in FIG. 6, the method further includes the following steps.

S710: A terminal receives information reflecting a correspondence between a RACH time-frequency resource and a RACH spatial resource.

S720: The terminal determines, based on the information reflecting the correspondence between the RACH time-frequency resource and the RACH spatial resource, the RACH time-frequency resource corresponding to each of the at least one beam.

In this case, step S630 includes the following step.

S730: The terminal forms at least one beam based on spatial configuration information, and sends a random access preamble to a network side by using the at least one beam and on all or part of the RACH time-frequency resource corresponding to each of the at least one beam.

The correspondence may be a mapping relationship or an association relationship. In this way, a time-frequency resource corresponding to an RACH spatial resource may be determined, or a spatial resource corresponding to an RACH time-frequency resource may be determined, thereby further reducing a time spent by the terminal to determine the RACH time-frequency resource on a sending beam, improving random access efficiency, and reducing a random access delay.

It should be noted that the time-frequency configuration information and the spatial configuration information may be simultaneously sent to the terminal, or may be separately sent to the terminal. For example, the network side generates random access resource configuration information. The random access resource configuration information includes the time-frequency configuration information and the spatial configuration information. The network side sends the random access resource configuration information to the terminal, and therefore the time-frequency configuration information and the spatial configuration information are sent to the terminal simultaneously. In addition, the information reflecting the correspondence between the RACH time-frequency resource and the RACH spatial resource may also be sent to the terminal together with the time-frequency configuration information, or may be sent to the terminal together with the spatial configuration information, or the three pieces of information may be sent to the terminal together. For example, the random access resource configuration information may further carry the information reflecting the correspondence between the RACH time-frequency resource and the RACH spatial resource. In addition, the foregoing pieces of information may be sent to the terminal through a single RAN device of the network side or may be sent to the terminal through different RAN devices. In addition, the network side may send the pieces of information through one or more RAN devices. Correspondingly, the terminal may send the random access preamble to one or more RAN devices. When the terminal sends the random access preamble to a plurality of RAN devices, an RAR may be fed back to the terminal by one RAN device, and a subsequent message 3 and message 4 are both transmitted between the RAN device and the terminal. As can be seen, an RAN device sending the time-frequency configuration information and the spatial configuration information may be the same as or different from an RAN device receiving the random access preamble and sending the RAR.

Optionally, the spatial configuration information includes a beam identifier (beam ID), and further comprises an antenna weight and/or precoding information corresponding to the beam identifier, for example, a precoding matrix indication (PMI). In this case, the spatial configuration information is preferably uplink spatial configuration information, or may be downlink spatial configuration information when channel reciprocity is satisfied.

When the downlink spatial configuration information is used, information about a mapping relationship (which may be based on a symbol or a subframe) between a PRACH time-frequency resource configuration and a downlink beam identifier may be included, so that the terminal learns that there is a PRACH resource at a time-domain position that has a time offset (time offset, in symbols or subframes) relative to a symbol (a subframe) on which a downlink beam, where a synchronization channel and/or a reference signal is detected, is located. Therefore, the terminal forms an uplink beam based on spatial information of the corresponding downlink beam to send the random access preamble. In addition, the network side may form an uplink receiving beam based on corresponding spatial information to receive the random access preamble that is sent by the terminal on a corresponding PRACH resource. A PRACH resource configuration may further include information about a mapping relationship between the PRACH resource configuration and a channel state information-reference signal (CSI-RS) port, and the mapping relationship information is used to determine a correspondence between a PRACH resource and a TRP. For example, the terminal may specifically send the random access preamble to a particular TRP.

When the spatial configuration information includes the beam identifier, an RACH time-frequency resource and an RACH spatial resource may be mapped or associated by using the beam identifier. In this case, the information reflecting the correspondence between the RACH time-frequency resource and the RACH spatial resource includes a correspondence between the time-frequency resource and the beam identifier. In this way, complexity of the correspondence may be reduced. For example, the spatial configuration information includes a beam identifier 1 to a beam identifier b, where b is a positive integer greater than 1. Each beam identifier corresponds to an antenna weight and/or precoding information. The spatial configuration information includes a correspondence between a beam identifier and an RACH time-frequency resource, and an RACH time-frequency resource corresponding to the beam identifier 1 may be found based on the correspondence. The terminal may select all or part of the corresponding RACH time-frequency resource, to send the random access preamble on a beam corresponding to the beam identifier 1, thereby initiating random access more rapidly and improving random access efficiency.

Optionally, the spatial configuration information includes sending beam pattern information of the random access preamble, used to indicate a beam pattern used by the terminal to send the random access preamble in an uplink. In this way, the network side may receive the random access preamble at a specified time and frequency position and in a specified beam direction by using a corresponding receiving beam, thereby further reducing the random access delay. The sending beam pattern information of the random access preamble may include all or some of uplink beam information. If the network side does not indicate the sending beam pattern information of the random access preamble, the terminal may send the random access preamble in all beam directions. For any random access preamble, the network side may form a plurality of uplink receiving beams to perform receiving, to find an optimal uplink beam and downlink beam through this process. The information includes but is not limited to one or more of the following information: a beam angle, a beam width, a beam quantity, a beam sweeping direction, a beam sweeping range, a beam sweeping mode, a beam switching time, and a beam sending occasion. The beam sweeping mode is, for example, sequential sweeping, random sweeping, or interval sweeping. The interval sweeping is, for example, a sweeping manner for performing sweeping at an interval of s beams, where s is a positive integer. If the interval is one beam and beams are 0 to 7, a sweeping sequence is 1, 3, 5, 7, 0, 2, 4, and 6. Therefore, the network side may determine an uplink receiving beam based on a parameter such as the beam angle, the beam width, the beam sweeping direction, or the beam sweeping range corresponding to the foregoing information, to reduce a receiving delay and improve a receiving effect and receiving efficiency. It may be understood that a receiving beam of the network side and a sending beam of the terminal are not necessarily in a one-to-one correspondence, and may be in a many-to-one or many-to-many correspondence.

The time-frequency configuration information may be sent to the terminal by using system information or by using dedicated signaling, for example, is sent to the terminal by using RRC signaling or MAC layer signaling. Similarly, the spatial configuration information may be sent to the terminal by using system information or by using dedicated signaling, for example, is sent to the terminal by using RRC signaling or MAC layer signaling. Sending of the information reflecting the correspondence between the RACH time-frequency resource and the RACH spatial resource is similar, and details are not described herein again.

Optionally, the network side may further send, to the terminal, random access preamble configuration information and information reflecting a correspondence between a random access preamble configuration and a downlink beam. Information about the correspondence may be, for example, a correspondence between a random access preamble configuration and a downlink beam identifier. In other words, random access preambles are grouped based on beam identifiers. Therefore, the terminal may determine, based on spatial information corresponding to a detected downlink beam identifier, a corresponding PRACH resource and information about an uplink beam used to send the random access preamble, and the network side forms an uplink receiving beam based on the information, to receive the random access preamble on the corresponding uplink beam.

For a non-contention-based random access process, after sending the time-frequency configuration information and the spatial configuration information, the network side may specify a required RACH resource and random access preamble in a subsequent process in which random access needs to be initiated. For example, in a random access process initiated by a handover process or downlink out-of-synchronization, the network side sends information about the specified RACH resource and random access preamble to the terminal.

In step S640, the terminal receives, in an RAR window, the RAR sent by the network side. A starting position of the RAR window is a kth symbol of an (n+m)th subframe, the RAR window has a length of L*N*M, n is a subframe in which a first beam used by the terminal to send the random access preamble is located, k is a symbol on which the first beam used to send the random access preamble is located, m is a preset quantity of subframes, for example, may be 3 or another value such as 2 or 4, L is a maximum quantity of opportunities for receiving an RAR in the RAR window and for one beam used to send the random access preamble, N is a quantity of symbols or subframes occupied by the RAR, and M is a quantity of beams used to send the RAR at one RAR receiving opportunity. For example, the network side sends RAR beams for a plurality of different directions at one RAR receiving opportunity.

Figure 8:
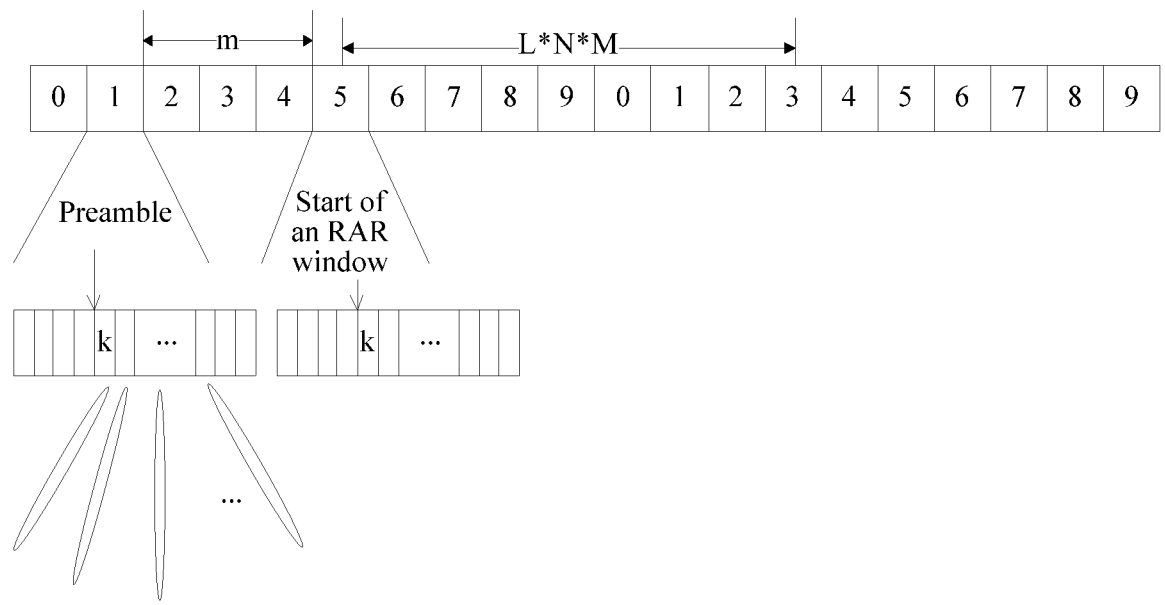
FIG. 8 is a schematic diagram of an RAR window according to an embodiment of this application.

For example, FIG. 8 is a schematic diagram of an RAR window according to an embodiment of this application. A terminal sends a same random access preamble by using a plurality of beams. A first beam used to send the random access preamble is located on a kth symbol of an nth subframe, and a starting position of the RAR window is a kth symbol of an (n+m)th subframe. The RAR window has a length of L*a quantity of symbols or subframes occupied by an RAR*a quantity of beams used to send the RAR.

In addition, for the beams used to send the same random access preamble, positions of opportunities for receiving the RAR are different from each other. For example, for an Xth beam used to send the foregoing random access preamble, an opportunity for receiving the RAR in the RAR window is located at a symbol position on which the Xth beam is located in a subframe+m subframes+(RAR symbol length/random access preamble symbol length)*X, where X is an integer greater than or equal to 0.

One RAR beam may occupy a time length of one or more symbols or a time length of one subframe. Therefore, the RAR window may include subframes and/or symbols corresponding to starting times and ending times corresponding to a plurality of beams. The RAR window may be a plurality of continuous or discontinuous subframes or a plurality of symbol positions in a plurality of subframes. For different sending beams of a same random access preamble, corresponding RAR beams have different start points and end points in time domain.

For ease of understanding, it is assumed that the random access preamble occupies a length of one symbol, each RAR occupies a length of two symbols, and m=3. There are three beams sending a same random access preamble. A zeroth beam is used to send the random access preamble to the terminal on a zeroth symbol of a zeroth subframe, and the terminal receives a first RAR on a zeroth symbol of a third subframe (a first opportunity for receiving an RAR for the zeroth beam). A first beam is used to send the random access preamble to the terminal on a first symbol of the zeroth subframe, and the terminal receives a second RAR on a second symbol (that is, a ((2/1)*1)th symbol) of the third subframe (a first opportunity for receiving an RAR for the first beam). A second beam is used to send the random access preamble to the terminal on a second symbol of the zeroth subframe, and the terminal receives a third RAR on a fourth symbol (that is, a ((2/1)*2)th symbol) of the third subframe (a first opportunity for receiving an RAR for the second beam).

Optionally, it may be considered that each beam corresponds to an RAR sub window. The sub window is discontinuous in time domain, and includes L opportunities for receiving an RAR. The RAR sub windows may have different starting positions and include different quantities of subframes, and subframes in which the RAR sub windows are located may be overlapped.

In the foregoing embodiment, the RACH time-frequency resource and the RACH spatial resource may be statically configured, or may be dynamically configured as required, or may be statically configured in advance and then dynamically activated as required. In another solution, a dynamic configuration or activation manner is used, so that the RACH resource is configured in a time segment in which the RACH resource is required. Compared with the static configuration solution, air interface overheads for configuring the RACH resource are reduced. In addition, RACH resources are configured more densely and timely, thereby reducing a delay of a random access process.

In addition, when the RACH resource is dynamically configured or triggered, the RAR window may also be dynamically determined, the terminal determines the RAR window by using an opportunity for sending the random access preamble by using the dynamically configured or triggered RACH resource, and a determining method is the same as that described above. Details are not described herein again.

Figure 9:
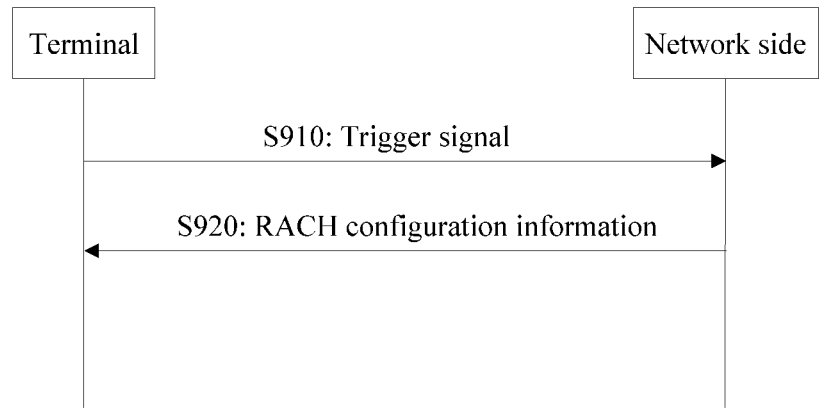
FIG. 9 is a schematic diagram of another communication method according to an embodiment of this application.

FIG. 9 is a schematic diagram of another communication method according to an embodiment of this application. The method is used to dynamically configure an RACH resource. The RACH resource may be a time-frequency resource, may be a spatial resource, or may be a spatial resource and a time-frequency resource. As shown in FIG. 9, the method includes the following steps.

S910: A terminal sends a trigger signal to a network side. The trigger signal is used to trigger the network side to send RACH configuration information. The RACH configuration information may be the time-frequency configuration information or the spatial configuration information, or may include both the time-frequency configuration information and the spatial configuration information.

The network side receives the trigger signal, and performs step S920.

S920: The network side sends the RACH configuration information to the terminal based on the trigger signal.

The terminal receives the RACH configuration information sent by the network side, and performs the random access process in the foregoing embodiment when random access needs to be initiated.

Optionally, the RACH configuration information further includes the foregoing information reflecting a correspondence between an RACH time-frequency resource and an RACH spatial resource.

With reference to the foregoing embodiment, before step S610 or S620, the communication method further includes: sending, by the terminal, a first trigger signal to the network side, where the first trigger signal is used to trigger the network side to send the spatial configuration information and/or the time-frequency configuration information.

The terminal may send the first trigger signal to the network side through a low-frequency cell, or may send the first trigger signal to the network side through a high-frequency cell.

Preferably, the terminal may send the first trigger signal through a low-frequency cell, to trigger the network side to send the RACH configuration information. Preferably, the network side configures the RACH configuration information for the terminal through a low-frequency cell, so that the terminal can rapidly initiate a random access process without waiting for detection of a downlink synchronization channel of a high-frequency cell, thereby reducing a random access delay. For example, a dedicated preamble or a dedicated SR (which is an SR with a preset format) used to trigger the network side to send the RACH configuration information may be configured for the terminal in the low-frequency cell. In this case, the dedicated preamble or the dedicated SR is used to instruct the network side to send the RACH configuration information. When the terminal sends the dedicated preamble or the dedicated SR to the network side, the network side sends the RACH configuration information to the terminal based on the dedicated preamble or the dedicated SR.

In an implementation, the RACH configuration information is spatial configuration information. In this case, the network side pre-configures the time-frequency configuration information for the terminal, for example, sends the time-frequency configuration information to the terminal by using system information. When the terminal loses uplink synchronization or cannot determine an optimal downlink beam, for example, after the terminal goes through relatively long discontinuous-reception dormancy duration, the terminal sends the first trigger signal to the network side. After receiving the trigger signal, the network side sends the spatial configuration information to the terminal, so that the terminal forms a sending beam based on the spatial configuration information, and sends, by using the sending beam, a random access preamble on all or part of RACH time-frequency resource indicated by the time-frequency configuration information. There may be one or more sending beams.

In another implementation, the RACH configuration information is time-frequency configuration information. In this case, a configuration process in which the network side pre-configures the spatial configuration information and then triggers the time-frequency configuration information is similar to the foregoing process. Details are not described herein again.

In still another implementation, the RACH configuration information includes time-frequency configuration information and spatial configuration information. In this case, the network side does not perform pre-configuration, and sends the time-frequency configuration information and the spatial configuration information when receiving the first trigger signal.

Optionally, configuration information may include configuration information of a mapping relationship between a beam (corresponding to a sending beam used by the network side to send an RAR) used by the terminal to receive an RAR and RACH time-frequency configuration information in time domain and configuration information of a mapping relationship between the beam used by the terminal to receive an RAR and RACH spatial configuration information in time domain.

Figure 10:
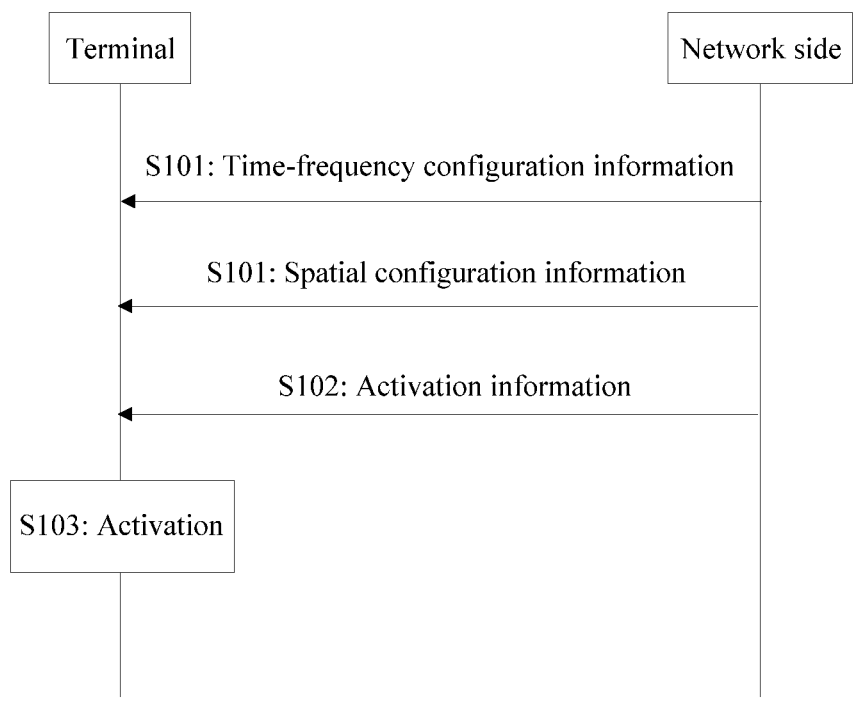
FIG. 10 is a schematic diagram of another communication method according to an embodiment of this application.

FIG. 10 is a schematic diagram of another communication method according to an embodiment of this application. The method is used to dynamically activate an RACH resource. The RACH resource may be a time-frequency resource, may be a spatial resource, or may be a spatial resource and a time-frequency resource. As shown in FIG. 10, the method includes the following steps.

S101: A network side sends the time-frequency configuration information and the spatial configuration information to a terminal.

After receiving the time-frequency configuration information and the spatial configuration information, the terminal does not activate resources indicated by the time-frequency configuration information and the spatial configuration information. Instead, the terminal activates, after receiving activation information delivered by the network side, all or part of the resources indicated by the time-frequency configuration information and the spatial configuration information.

S102: The network side sends activation information to the terminal. The activation information is used to instruct the terminal to activate all or part of the RACH time-frequency resource indicated by the time-frequency configuration information on a target beam, and the target beam is all or some of beams indicated by the RACH spatial configuration information, that is, all or some of the at least one beam.

S103: The terminal receives the activation information from the network side, and activates, based on the activation information, the all or part of the RACH time-frequency resource indicated by the time-frequency configuration information on the target beam.

With reference to this embodiment and the foregoing embodiment, after steps S610 and S620, the communication method further includes steps S102 and S103.

This application does not limit a form of the activation information. For example, the activation information may be system information, RRC signaling, or MAC layer signaling; or may be an activation signal, for example, a synchronization signal or a reference signal.

Preferably, a correspondence between the activation signal and a to-be-activated RACH resource may be preset in the terminal, or a correspondence between the activation signal and a to-be-activated RACH resource is sent by the network side to the terminal. The terminal activates, based on the correspondence between the activation signal and the to-be-activated RACH time-frequency resource, an RACH time-frequency resource corresponding to the activation signal received by the terminal. The activation herein is to make an RACH resource in an available state.

It should be noted that, the correspondence between the activation signal and the to-be-activated RACH resource may be in a one-to-one correspondence, or may be in a one-to-many correspondence, or may be in a many-to-one correspondence.

Figure 11:
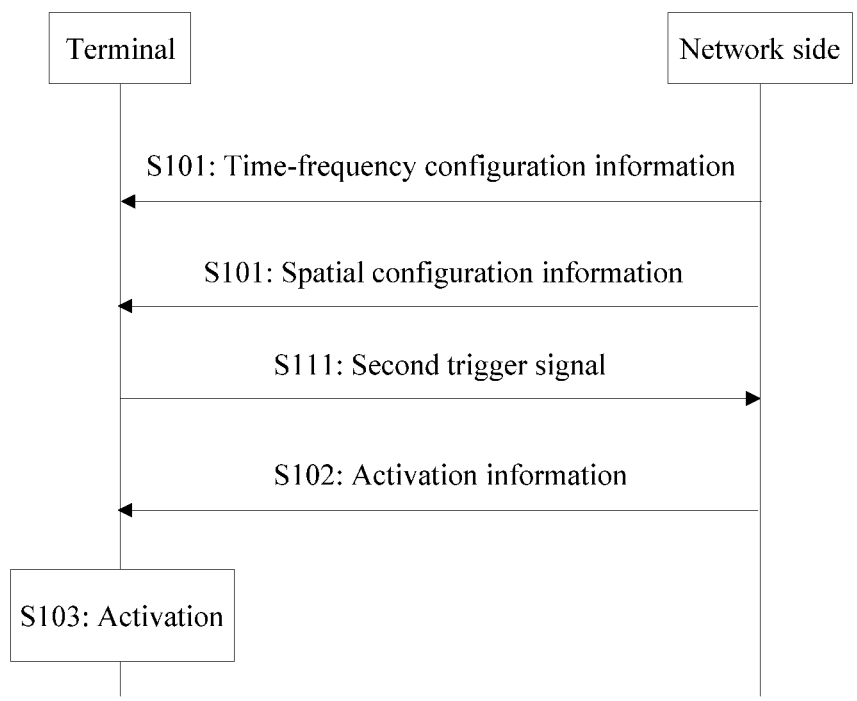
FIG. 11 is a schematic diagram of another communication method according to an embodiment of this application.

Activation of the RACH resource may alternatively be triggered by the terminal. For example, referring to FIG. 11, a difference between an embodiment shown in FIG. 11 and the embodiment shown in FIG. 10 is that before step S1002, the communication method further includes:

S111: The terminal sends a second trigger signal to the network side, where the second trigger signal is used to trigger the network side to send the activation information.

The terminal may send the second trigger signal to the network side through a low-frequency cell, or may send the second trigger signal to the network side through a high-frequency cell.

Preferably, the terminal may send the second trigger signal through a low-frequency cell, to trigger the network side to activate an RACH resource in a high-frequency cell, so that the terminal can rapidly initiate a random access process without waiting for detection of a downlink synchronization channel of the high-frequency cell, thereby reducing a random access delay.

For example, a dedicated preamble or a dedicated SR (which is an SR with a preset format) used to trigger the high-frequency cell to send the activation information may be configured for the terminal in the low-frequency cell. When the terminal sends the dedicated preamble or the dedicated SR to the network side in the low-frequency cell, the network side sends the activation information to the terminal based on the dedicated preamble or the dedicated SR. In this case, an RAN device serving the low-frequency cell may notify an RAN device serving the high-frequency cell of a downlink beam range.

Preferably, in the foregoing embodiment, the time-frequency configuration information and the spatial configuration information are configured for the terminal through a low-frequency cell, and the RACH resource configured by the time-frequency configuration information and the beam configured by the spatial configuration information have a mapping relationship, and are in a deactivated state. When receiving the activation information sent by the network side, the terminal activates all or part of the RACH resource configured by the time-frequency configuration information on all or some of the beams.

Optionally, the terminal may determine a candidate downlink beam based on the activation signal that is received through the high-frequency cell. For example, a beam on which the activation signal is located is the candidate downlink beam. Then, the terminal determines at least one uplink beam based on channel reciprocity, and sends the random access preamble by using the at least one determined uplink beam.

Optionally, the network side may determine one or more optimal downlink beams based on a status of receiving the random access preamble on RACH time-frequency resources corresponding to a plurality of beams, and send an RAR by using the determined downlink beam. A subsequent message 3 and message 4 may be sent by using the determined uplink beam and downlink beam.

In steps S610 and S620, the network side preferably sends the time-frequency configuration information and the spatial configuration information to the terminal through a low-frequency cell. In this way, the terminal may initiate a random access process by using low-frequency timing as a reference, and can rapidly initiate the random access process without waiting for detection of a downlink synchronization channel of the high-frequency cell, thereby further reducing the random access delay. Further, information reflecting a correspondence between the RACH time-frequency resource and the RACH spatial resource may be sent to the terminal through the low-frequency cell.

Figure 12:
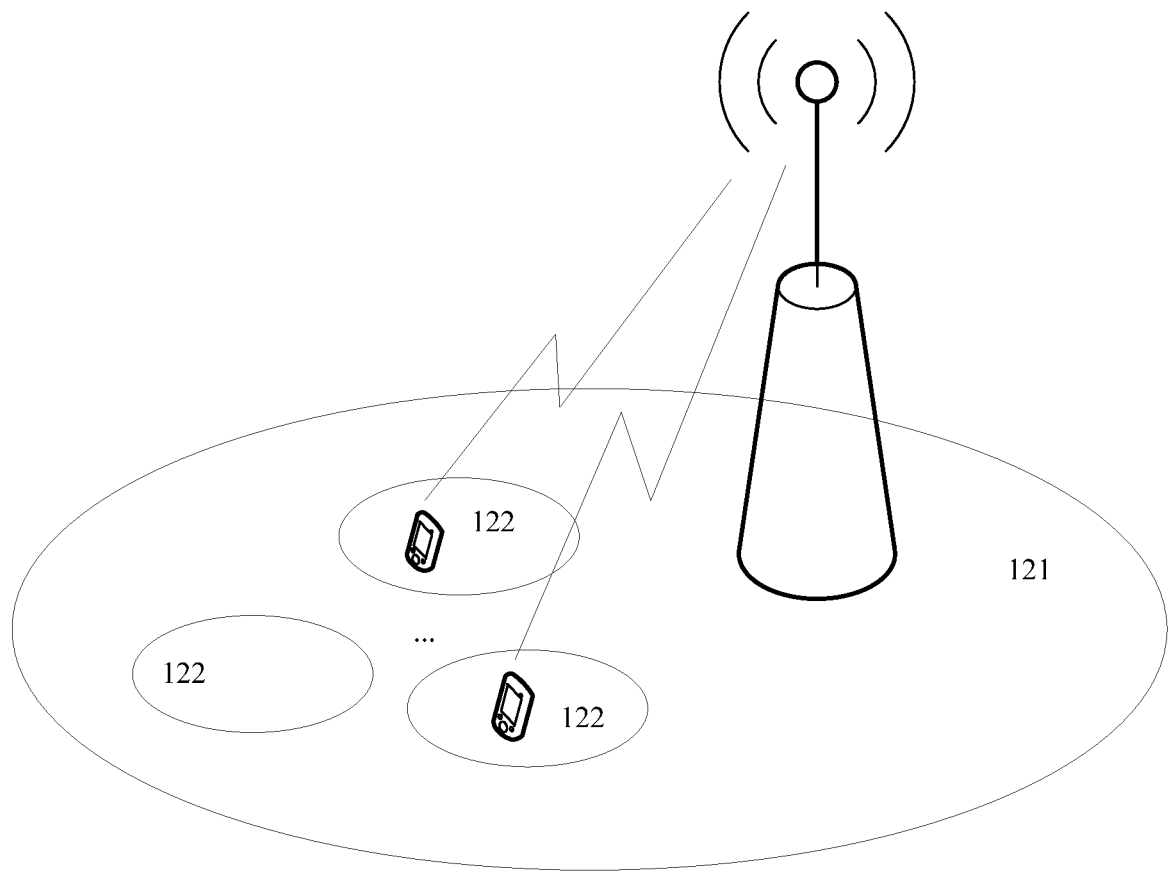
FIG. 12 is a schematic diagram of another communication scenario according to an embodiment of this application.

FIG. 12 is a schematic diagram of a communication scenario according to an embodiment of this application. As shown in FIG. 12, in the communication scenario, a high-frequency cell 122 exists within a coverage range of a low-frequency cell 121, and there may be one or more high-frequency cells 122. In another solution of this application, a network side sends time-frequency configuration information and spatial configuration information of the high-frequency cell 122 within the coverage range of the low-frequency cell 121 to a terminal through a low-frequency cell. In this way, the terminal directly initiates random access in the high-frequency cell based on downlink timing information of the low-frequency cell 121, the time-frequency configuration information, and the spatial configuration information, so that the terminal can rapidly initiate random access without waiting for detection of a downlink synchronization channel of the high-frequency cell.

Figure 13:
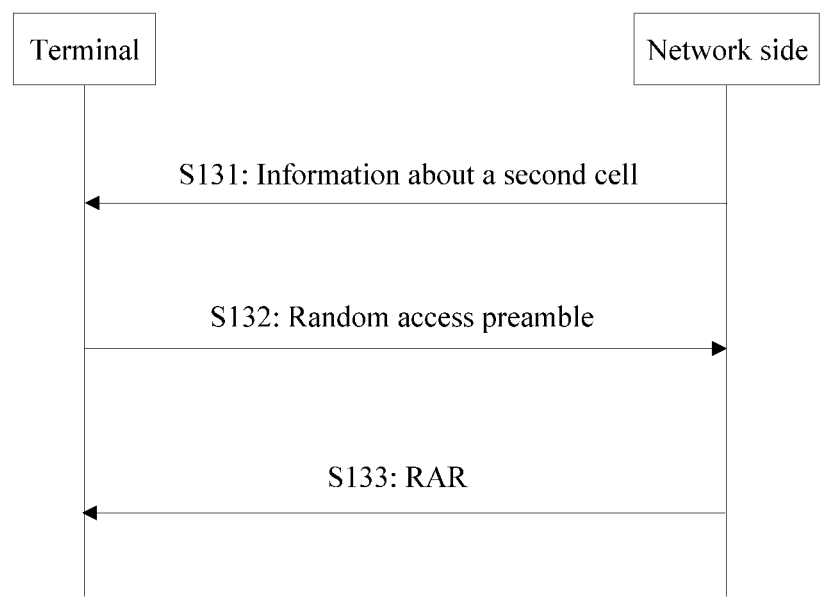
FIG. 13 is a schematic diagram of another communication method according to an embodiment of this application.

FIG. 13 is a schematic diagram of another communication method according to an embodiment of this application. As shown in FIG. 13, the method is applicable to the scenario shown in FIG. 12. A low-frequency cell is referred to as a first cell, and a high-frequency cell is referred to as a second cell. The method includes the following steps.

S131: A network side sends information about the second cell to a terminal in the first cell. The information about the second cell includes time-frequency configuration information and spatial configuration information. The second cell is located within a coverage range of the first cell, and a frequency band used by the second cell is higher than a frequency band used by the first cell.

The time-frequency configuration information and the spatial configuration information herein are the same as those described in the foregoing embodiments. Details are not described herein again.

Optionally, the network side may broadcast the time-frequency configuration information and the spatial configuration information of the second cell to all terminals in the first cell.

Optionally, the information about the second cell may further include one or more of the following information: an identifier of the second cell such as a physical cell identifier (PCI), a frequency band, configuration information of a random access preamble, and the like.

The terminal receives the time-frequency configuration information and the spatial configuration information of the second cell that are sent by the network side through the first cell, and performs step S132.

S132: The terminal forms at least one beam based on the spatial configuration information, and sends, by using the at least one beam, a random access preamble to the network side on all or part of the RACH time-frequency resource indicated by the time-frequency configuration information.

S133: The network side receives the random access preamble, and feeds back an RAR for the random access preamble.

Optionally, the network side may send the RAR on an optimal downlink beam at a high frequency.

Optionally, the RAR includes synchronization channel information or reference signal information of the high-frequency cell. The synchronization channel information or the reference signal information is used by the terminal to measure channel quality of a downlink beam, for example, to measure RSRP or RSRQ. In this way, it is beneficial to selecting an optimal beam, and reducing a time of beam training.

Optionally, the information about the second cell further includes information reflecting a correspondence between an RACH time-frequency resource and an RACH spatial resource. A description of the information is the same as that in the foregoing embodiment, and details are not described herein again. By configuring the correspondence, the terminal can select an RACH resource more rapidly in a random access process, thereby reducing a delay of the random access process.

Optionally, the information about the second cell further includes random access preamble configuration information and information reflecting a correspondence between a random access preamble configuration and a downlink beam. The information about the correspondence may be, for example, a correspondence between the random access preamble configuration and a downlink beam identifier. In other words, random access preambles are grouped based on beam identifiers.

In another solution of this application, the random access process is triggered by using a physical downlink control channel (PDCCH) sweeping subframe. This manner can reduce a random access delay, thereby reducing overheads of maintaining beam training between the network side and the terminal.

In a communications system, the terminal and the network side are not always in a communication state. For example, when there is no service requirement, the terminal and the network side often do not perform communication in a period of time. For another example, when the terminal is in a discontinuous reception (DRX) mode, the terminal and the network side may not perform communication in dormancy duration (opportunity for DRX). In this case, when the terminal has a service requirement, or when the terminal enters activation duration (on duration) from the dormancy duration, the terminal may lose uplink synchronization in the high-frequency cell, and may further lose beam information (for example, a downlink-uplink beam pair) proper for communication. When downlink data arrives or the network side sends a handover command to the terminal, currently, the network side needs to trigger a beam training process to obtain the beam information proper for communication, and trigger the random access process to implement uplink synchronization.

Based thereupon, in the solution of the PDCCH sweeping subframe provided in this embodiment of this application, the network side configures the PDCCH sweeping subframe, and sends a PDCCH by sweeping a plurality of downlink beams on the PDCCH sweeping subframe.

Figure 14:
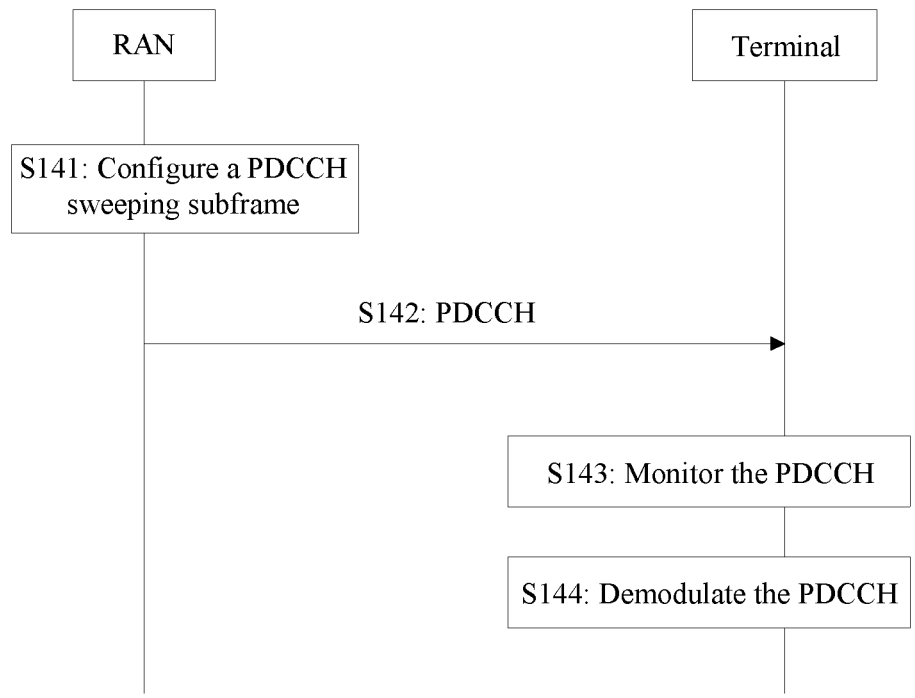
FIG. 14 is a schematic diagram of still another communication method according to an embodiment of this application.

FIG. 14 is a schematic diagram of still another communication method according to an embodiment of this application. As shown in FIG. 14, the method includes the following steps.

S141: An RAN device configures a first subframe as a PDCCH sweeping subframe. The PDCCH sweeping subframe includes a plurality of symbol units, and each symbol unit is configured to send a PDCCH by using a beam.

The symbol unit includes one or more symbols, in other words, each beam occupies one or more symbols.

Figure 15:
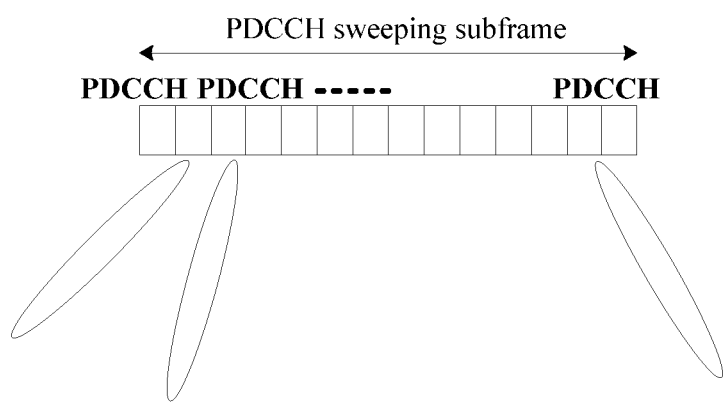
FIG. 15 is a schematic diagram of a PDCCH sweeping subframe according to an embodiment of this application.

FIG. 15 is a schematic diagram of a PDCCH sweeping subframe according to an embodiment of this application. As shown in FIG. 15, the PDCCH sweeping subframe is used to send a PDCCH on a plurality of symbols by using a plurality of beams.

S142: The RAN device sends a PDCCH on each symbol unit by using a beam.

Sending the PDCCH means sending information on the PDCCH.

S143: A terminal monitors the PDCCH on the PDCCH sweeping subframe, and demodulates the PDCCH when detecting the PDCCH.

This application does not limit a time-domain position of the PDCCH sweeping subframe, which may be set as required.

Optionally, the plurality of beams may be wide beams or a plurality of beams performing parallel sweeping, to further reduce a delay.

Optionally, the RAN device sends downlink beam pattern (DL beam pattern) information to the terminal, so that the terminal monitors the PDCCH on a corresponding beam based on the downlink beam pattern information, and further demodulates the PDCCH. The downlink beam pattern information may include one or more of the following information: a beam width, a beam angle, a beam direction, a beam sweeping sequence, a beam quantity, and the like. For example, the terminal may receive the downlink beam pattern in activation duration of DRX, or the terminal is triggered through a low-frequency cell to receive a downlink beam in a high-frequency cell. Alternatively, when a high-frequency cell is in a deactivated state, the RAN device is triggered through a low-frequency cell to send a downlink beam, so that the terminal receives the downlink beam in the high-frequency cell.

Optionally, the RAN device may further send a reference signal and/or a synchronization channel on each beam, so that the terminal performs measurement based on the reference signal and/or the synchronization channel, to obtain one or more optimal downlink beams. If channel reciprocity exists, an optimal uplink beam may be determined based on the channel reciprocity. In this way, a beam used for communication can be determined more rapidly, thereby reducing a communication delay.

Steps related to network elements mentioned in the methods disclosed in the foregoing embodiments may be respectively performed by apparatuses on corresponding network elements.

Figure 16:
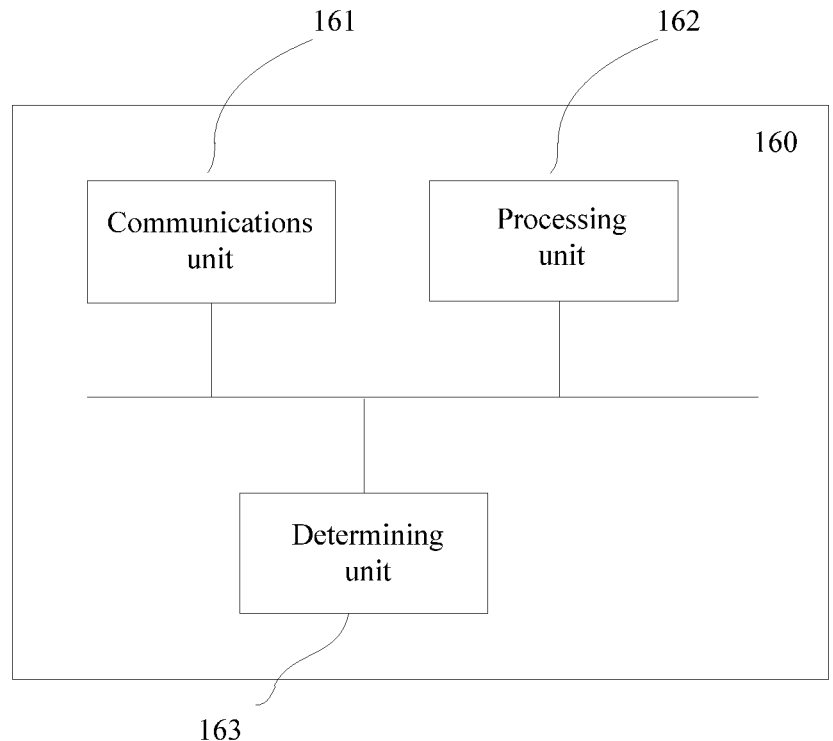
FIG. 16 is a schematic diagram of a communications apparatus according to an embodiment of this application.

FIG. 16 is a schematic diagram of a communications apparatus according to an embodiment of this application. The apparatus is located in a terminal, and is configured to perform some or all of the operations performed by the terminal in the foregoing embodiments. As shown in FIG. 16, the apparatus 160 includes a communication unit 161 and a processing unit 162. The communication unit 161 is configured to receive time-frequency configuration information and spatial configuration information from a network side. The time-frequency configuration information is used to indicate an RACH time-frequency resource, and the spatial configuration information is used to indicate an RACH spatial resource. The processing unit 162 is configured to form at least one beam based on the spatial configuration information, and send, by using the at least one beam, a random access preamble to the network side on all or part of the RACH time-frequency resource indicated by the time-frequency configuration information. The communication unit 161 is further configured to receive an RAR for the random access preamble from the network side.

A description of the spatial configuration information is the same as that in the foregoing embodiment, and details are not described herein again.

Optionally, the communication unit 161 is further configured to receive information reflecting a correspondence between the RACH time-frequency resource and the RACH spatial resource. In this case, the processing unit is configured to: form at least one beam based on the spatial configuration information, and send the random access preamble to the network side by using the at least one beam and on all or part of the RACH time-frequency resource corresponding to each of the at least one beam.

A description of the information reflecting the correspondence between the RACH time-frequency resource and the RACH spatial resource is similar to that in the foregoing embodiment, and details are not described herein again.

Optionally, the communication unit 161 is further configured to send a first trigger signal to the network side, where the first trigger signal is used to trigger the network side to send the spatial configuration information and/or the time-frequency configuration information.

Optionally, the communication unit 161 is further configured to receive activation information from the network side. The activation information is used to instruct the terminal to activate the all or part of the RACH time-frequency resource indicated by the time-frequency configuration information on a target beam, and the target beam is all or some of the at least one beam. The processing unit 162 is further configured to activate, based on the activation information, the all or part of the RACH time-frequency resource indicated by the time-frequency configuration information on the target beam.

A description of the activation information is the same as that in the foregoing embodiment, and details are not described herein again.

When the activation information includes an activation signal, for example, a synchronization signal or a reference signal, the processing unit 162 is configured to activate, based on a correspondence between the activation signal and a to-be-activated RACH time-frequency resource, an RACH time-frequency resource corresponding to the activation signal. The correspondence between the activation signal and the to-be-activated RACH resource is preset in the terminal or is configured by the network side for the terminal.

Optionally, the communication unit 161 is further configured to: before the terminal receives the activation information, send a second trigger signal to the network side, where the second trigger signal is used to trigger the network side to send the activation information.

Still referring to FIG. 16, optionally, the apparatus 160 may further include a determining unit 163. The determining unit 163 is configured to determine an RAR window. The communication unit 161 is configured to receive the RAR in the RAR window. Descriptions of the RAR window and an opportunity for receiving the RAR in the RAR window are similar to those in the foregoing embodiment, and details are not described herein again.

It should be understood that division of the various units of the communications apparatus 160 is merely logical function division. During actual implementation, all or some of the units may be integrated into one physical entity or may be physically separated. In addition, all the units may be implemented in a form of software invoked by a processing element, or may be implemented in a form of hardware; or some units may be implemented in a form of software invoked by a processing element, and some units are implemented in a form of hardware. For example, the processing unit may be an independent processing element, or may be integrated into a chip of the terminal for implementation, or moreover, may be stored in a memory of the terminal in a program form, and is invoked by a processing element of the terminal to perform functions of the foregoing units. Implementation of other units is similar. In addition, all or some of the units may be integrated together, or may be implemented independently. The processing element described herein may be an integrated circuit having a signal processing capability. In an implementation process, steps in the foregoing methods or the foregoing units can be implemented by using a hardware integrated logical circuit in the processing element or by using instructions in a form of software.

For example, the foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented in a form of a processing element scheduling a program, the processing element may be a general purpose processor, for example, a central processing unit (CPU) or another processor that can invoke a program. For another example, the units may be integrated and implemented in a system-on-a-chip (SOC) form.

Figure 17:
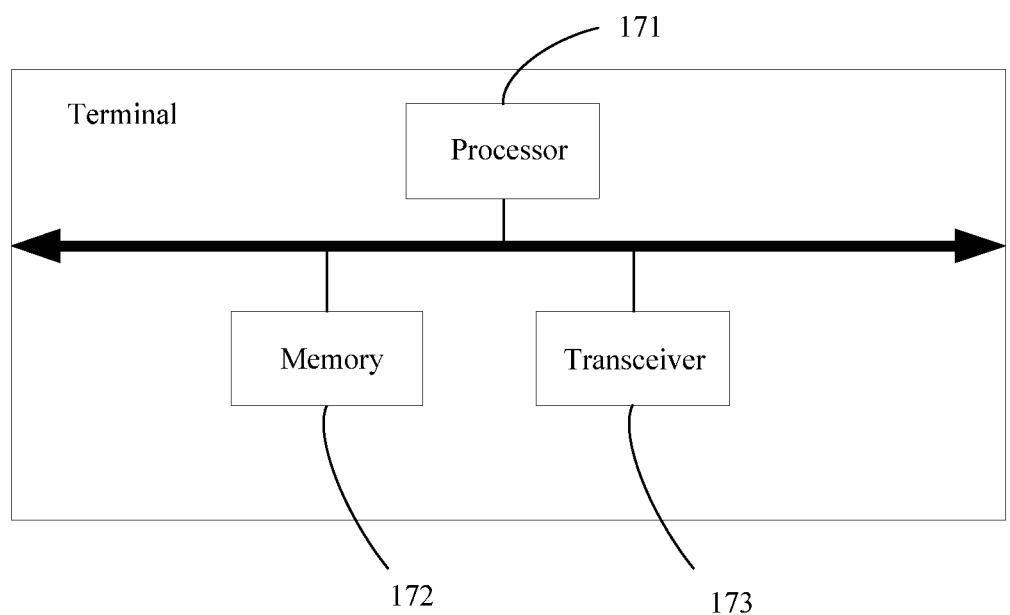
FIG. 17 is a schematic structural diagram of a terminal according to an embodiment of this application.

FIG. 17 is a schematic structural diagram of a terminal according to an embodiment of this application. As shown in FIG. 17, the terminal includes a processor 171, a memory 172, and a transceiver 173. The transceiver 173 may be connected to an antenna. In a downlink direction, the transceiver 173 receives, through the antenna, information sent by a network side, and sends the information to the processor 171 for processing. In an uplink direction, the processor 171 processes data of the terminal, and sends the data to the network side through the transceiver 173.

The memory 172 is configured to store a program. The processor 171 invokes the program, to perform the operations of the method embodiment, thereby implementing the functions of the units shown in FIG. 16.

It may be understood that the structure of the terminal may also be applied to the terminal in any method in FIG. 9 to FIG. 11, FIG. 13, and FIG. 14. The processor invokes the program in the memory to perform the steps performed by the terminal in any method in FIG. 9 to FIG. 11, FIG. 13, and FIG. 14. In addition, in any method shown in the accompanying drawings, the terminal includes units for performing the steps in the method, and division of the units is merely logical function division. During actual implementation, all or some of the units may be integrated into one physical entity or may be physically separated.

Figure 18:
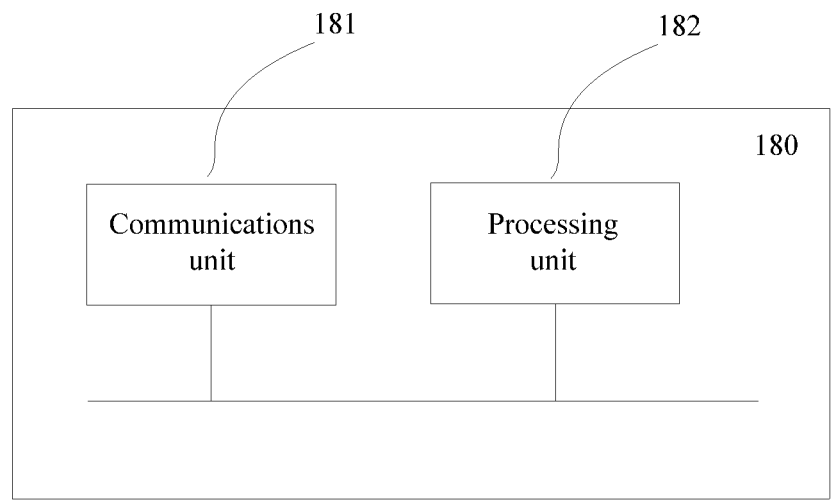
FIG. 18 is a schematic diagram of a communications apparatus according to an embodiment of this application.

FIG. 18 is a schematic diagram of a communications apparatus according to an embodiment of this application. The apparatus is located in an RAN device of a network side, and is configured to perform some or all of the operations performed by the network side in the foregoing embodiments. As shown in FIG. 18, the apparatus 180 includes a communication unit 181 and a processing unit 182. The processing unit 182 is configured to control the communication unit 181 to send time-frequency configuration information and spatial configuration information to a terminal, where the time-frequency configuration information is used to indicate an RACH time-frequency resource, and the spatial configuration information is used to indicate an RACH spatial resource, so that the terminal forms at least one beam based on the spatial configuration information and initiates, by using the at least one beam, random access on all or part of the RACH time-frequency resource indicated by the time-frequency configuration information.

A description of the spatial configuration information is the same as that in the foregoing embodiment, and details are not described herein again.

Optionally, the processing unit 182 is further configured to control the communication unit 181 to send information reflecting a correspondence between the RACH time-frequency resource and the RACH spatial resource to the terminal. A description of the information reflecting the correspondence between the RACH time-frequency resource and the RACH spatial resource is similar to that in the foregoing embodiment, and details are not described herein again.

Optionally, the communication unit 181 is further configured to receive a first trigger signal from the terminal, where the first trigger signal is used to trigger the RAN device to send the spatial configuration information and/or the time-frequency configuration information. In this case, the processing unit 182 is further configured to control, based on the first trigger signal, the communication unit 181 to send the time-frequency configuration information and/or the spatial configuration information.

Optionally, the processing unit 182 is further configured to control the communication unit 181 to send activation information to the terminal, where the activation information is used to instruct the terminal to activate all or part of the RACH time-frequency resource indicated by the time-frequency configuration information on a target beam, and the target beam is all or some of the at least one beam.

A description of the activation information is the same as that in the foregoing embodiment, and details are not described herein again.

Optionally, the processing unit 182 is further configured to control the communication unit 181 to send, to the terminal, synchronization channel information or reference signal information on a beam used to send an RAR.

Optionally, the processing unit 182 is further configured to control the communication unit 181 to send random access preamble configuration information and information reflecting a correspondence between a random access preamble configuration and a downlink beam to the terminal.

Optionally, the processing unit 182 is further configured to control the communication unit 181 to send RAR spatial resource information to the terminal. The RAR spatial resource information is used to indicate a beam pattern of a sending beam of the RAR, so that the terminal receives the RAR based on the RAR spatial resource information.

Optionally, the RAR spatial resource information includes one or more of the following information: a beam angle, a beam width, a beam quantity, a beam sweeping direction, a beam sweeping range, a beam sweeping mode, a beam switching time, a beam sending occasion, a time offset between a starting position of a RAR window and a first beam used to send the random access preamble, and a length of the RAR window.

It should be understood that division of the various units of the communications apparatus 180 is merely logical function division. During actual implementation, all or some of the units may be integrated into one physical entity or may be physically separated. In addition, all the units may be implemented in a form of software invoked by a processing element, or may be implemented in a form of hardware; or some units may be implemented in a form of software invoked by a processing element, and some units are implemented in a form of hardware. For example, the processing unit may be an independent processing element, or may be integrated into a chip of the RAN device for implementation, or moreover, may be stored in a memory of the RAN device in a program form, and is invoked by a processing element of the RAN device to perform functions of the foregoing units. Implementation of other units is similar. In addition, all or some of the units may be integrated together, or may be implemented independently. The processing element described herein may be an integrated circuit having a signal processing capability. In an implementation process, steps in the foregoing methods or the foregoing units can be implemented by using a hardware integrated logical circuit in the processing element or by using instructions in a form of software.

For example, the foregoing units may be one or more integrated circuits configured to implement the foregoing method, for example, one or more application-specific integrated circuits (ASIC), one or more microprocessors (digital signal processor, DSP), or one or more field programmable gate arrays (FPGA). For another example, when one of the foregoing units is implemented in a form of a processing element scheduling a program, the processing element may be a general purpose processor, for example, a central processing unit (CPU) or another processor that can invoke a program. For another example, the units may be integrated and implemented in a system-on-a-chip (SOC) form.

Figure 19:
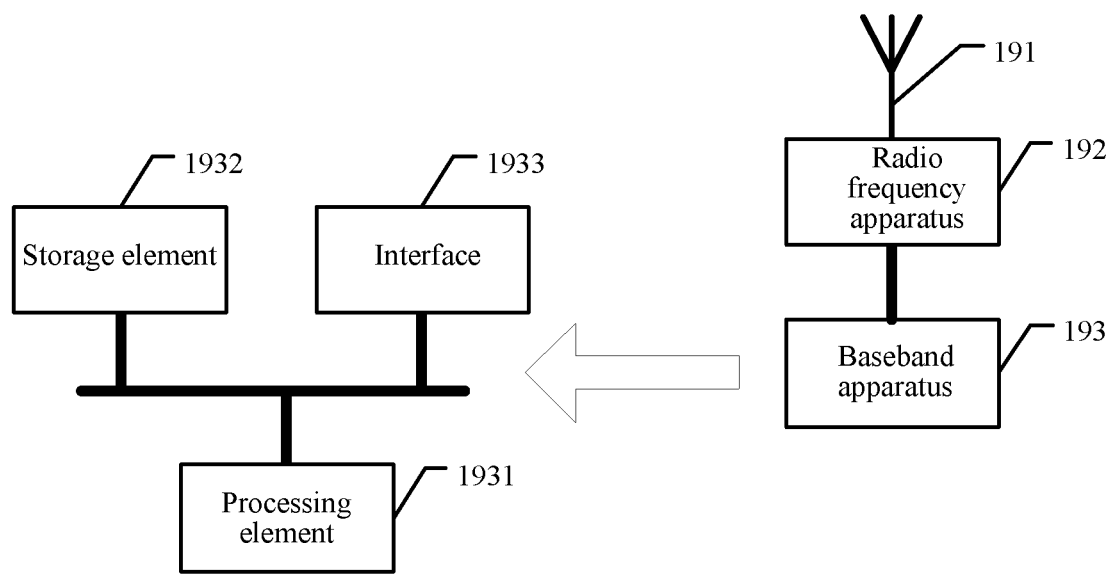
FIG. 19 is a schematic structural diagram of an RAN device according to an embodiment of this application.

FIG. 19 is a schematic structural diagram of an RAN device according to an embodiment of this application. As shown in FIG. 19, the RAN device includes an antenna 191, a radio frequency apparatus 192, and a baseband apparatus 193. The antenna 191 is connected to the radio frequency apparatus 192. In an uplink direction, the radio frequency apparatus 192 receives, through the antenna 191, information sent by the terminal, and sends, to the baseband apparatus 193 for processing, the information sent by the terminal. In a downlink direction, the baseband apparatus 193 processes the information for the terminal, and sends the information to the radio frequency apparatus 192. After processing the information for the terminal, the radio frequency apparatus 192 sends the information to the terminal through the antenna 191.

The communications apparatus 180 may be located in the baseband apparatus 193. In an implementation, the foregoing units are implemented in a form of a processing element scheduling a program. For example, the baseband apparatus 193 includes a processing element 1931 and a storage element 1932, and the processing element 1931 invokes a program stored in the storage element 1932, to perform the methods in the foregoing method embodiments. In addition, the baseband apparatus 193 may further include an interface 1933, configured to exchange information with the radio frequency apparatus 192. The interface is, for example, a common public radio interface (CPRI).

In another implementation, the foregoing units may be configured as one or more processing elements for implementing the foregoing method. The processing elements are disposed on the baseband apparatus 193. The processing element herein may be an integrated circuit, for example, one or more ASICs, one or more DSPs, or one or more FPGAs. The integrated circuits may be integrated together to form a chip.

For example, the foregoing units may be integrated together and implemented in a system-on-a-chip (SOC) form. For example, the baseband apparatus 193 includes an SOC chip, configured to implement the foregoing method.

A description of the processing element herein is the same as the foregoing description. The processing element may be a general purpose processor, for example, a CPU, or may be one or more integrated circuits configured to implement the foregoing method, for example, one or more ASICs, one or more DSPs, or one or more FPGAs.

The storage element may be a memory, or may be a collective term for a plurality of storage elements.

It may be understood that the structure of the RAN device may also be applied to the RAN device in any method in FIG. 9 to FIG. 11, FIG. 13, and FIG. 14. The processor invokes the program in the memory to perform the steps performed by the RAN device in any method in FIG. 9 to FIG. 11, FIG. 13, and FIG. 14. In addition, in any method shown in the accompanying drawings, the RAN device includes units for performing the steps in the method, and division of the units is merely logical function division. During actual implementation, all or some of the units may be integrated into one physical entity or may be physically separated.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A method, comprising:
receiving, by a terminal, time-frequency configuration information from a network side, wherein the time-frequency configuration information indicates a random access channel (RACH) time-frequency resource;
receiving, by the terminal, spatial configuration information from the network side, wherein the spatial configuration information indicates an RACH spatial resource, comprises a beam identifier, and further comprises an antenna weight or precoding information corresponding to the beam identifier;
sending, by the terminal, a random access preamble to the network side according to the time-frequency configuration information and the spatial configuration information; and
receiving, by the terminal, a random access response (RAR) corresponding to the random access preamble from the network side comprising:
determining an RAR window, wherein a starting position of the RAR window is a kth symbol of an (n+m)th subframe, the RAR window has a length of L*N*M, n is a subframe in which a first beam used by the terminal to send the random access preamble is located, k is a symbol on which the first beam is located, m is a preset quantity of subframes, L is a maximum quantity of opportunities for receiving an RAR in the RAR window and for one beam used to send the random access preamble, N is a quantity of symbols or subframes occupied by the RAR, and M is a quantity of beams used to send the RAR, wherein the quantity of beams corresponds to an opportunity for receiving the RAR; and
receiving the RAR in the RAR window.

2. The method according to claim 1, wherein sending, by the terminal, a random access preamble to the network side according to the time-frequency configuration information and the spatial configuration information comprises:
obtaining, by the terminal, a beam according to the spatial configuration information; and sending, using the beam, the random access preamble to the network side on at least part of the RACH time-frequency resource indicated by the time-frequency configuration information.

3. The method according to claim 2, further comprising:
receiving, by the terminal, information reflecting a correspondence between the RACH time-frequency resource and the RACH spatial resource, wherein:
sending, by the terminal, the random access preamble comprises:
sending the random access preamble to the network side using the beam on at least part of the RACH time-frequency resource corresponding to the beam.

4. The method according to claim 3, wherein the information reflecting the correspondence between the RACH time-frequency resource and the RACH spatial resource comprises a correspondence between the RACH time-frequency resource and a beam identifier.

5. The method according to claim 2, further comprising:
receiving, by the terminal, activation information from the network side, wherein the activation information instructs the terminal to activate at least part of the RACH time-frequency resource on a target beam; and
activating, by the terminal according to the activation information, the at least part of the RACH time-frequency resource on the target beam.

6. An apparatus, comprising a processor, configured to execute a program stored in a non-transitory computer readable storage medium to perform:
receiving time-frequency configuration information from a network side, wherein the time-frequency configuration information indicates a random access channel (RACH) time-frequency resource;
receiving spatial configuration information from the network side, wherein the spatial configuration information indicates an RACH spatial resource, comprises a beam identifier, and further comprises an antenna weight or precoding information corresponding to the beam identifier;
sending a random access preamble to the network side according to the time-frequency configuration information and the spatial configuration information; and
receiving a random access response (RAR) corresponding to the random access preamble from the network side comprising:
determining an RAR window, wherein a starting position of the RAR window is a kth symbol of an (n+m)th subframe, the RAR window has a length of L*N*M, n is a subframe in which a first beam used by the terminal to send the random access preamble is located, k is a symbol on which the first beam is located, m is a preset quantity of subframes, L is a maximum quantity of opportunities for receiving an RAR in the RAR window and for one beam used to send the random access preamble, N is a quantity of symbols or subframes occupied by the RAR, and M is a quantity of beams used to send the RAR, wherein the quantity of beams corresponds to an opportunity for receiving the RAR; and
receiving the RAR in the RAR window.

7. The apparatus according to claim 6, wherein when the program is executed by the processor, the following are performed for sending the random access preamble:
obtaining a beam according to the spatial configuration information; and
sending, using the beam, the random access preamble to the network side on at least part of the RACH time-frequency resource indicated by the time-frequency configuration information.

8. The apparatus according to claim 7, wherein when the program is executed by the processor, the following is further performed:
receiving information reflecting a correspondence between the RACH time-frequency resource and the RACH spatial resource, wherein:
sending the random access preamble comprises:
sending the random access preamble to the network side using the beam and on at least part of the RACH time-frequency resource corresponding to the beam.

9. The apparatus according to claim 8, wherein the information reflecting the correspondence between the RACH time-frequency resource and the RACH spatial resource comprises a correspondence between the RACH time-frequency resource and a beam identifier.

10. The apparatus according to claim 7, wherein when the program is executed by the processor, the following is further performed:
receiving activation information from the network side, wherein the activation information instructs the apparatus to activate at least part of the RACH time-frequency resource on a target beam; and
activating, according to the activation information, the at least part of the RACH time-frequency resource on the target beam.

11. An apparatus, comprising a processor, configured to execute a program stored in a non-transitory computer readable storage medium to perform:
sending time-frequency configuration information to a terminal, wherein the time-frequency configuration information indicates a random access channel (RACH) time-frequency resource;
sending spatial configuration information to the terminal, wherein the spatial configuration information indicates an RACH spatial resource, comprises a beam identifier, and further comprises an antenna weight or precoding information corresponding to the beam identifier, and wherein the terminal initiates random access according to the time-frequency configuration information and the spatial configuration information; and
sending, to the terminal, information reflecting a correspondence between the RACH time-frequency resource and the RACH spatial resource, wherein the information reflecting the correspondence between the RACH time-frequency resource and the RACH spatial resource comprises a correspondence between the RACH time-frequency resource and a beam identifier.

12. The apparatus according to claim 11, wherein when the program is executed by the processor, the following is further performed:
sending activation information to the terminal, wherein the activation information instructs the terminal to activate at least part of the RACH time-frequency resource on a target beam, and the target beam comprises at least part of one or more beams indicated by the spatial configuration information.

13. The apparatus according to claim 12, wherein the activation information comprises an activation signal, and the activation signal comprises a synchronization signal or a reference signal.

* * * * *